(12) United States Patent
Shakarian et al.

(10) Patent No.: US 10,437,945 B2
(45) Date of Patent: Oct. 8, 2019

(54) SYSTEMS AND METHODS FOR ORDER-OF-MAGNITUDE VIRAL CASCADE PREDICTION IN SOCIAL NETWORKS

(71) Applicant: ARIZONA BOARD OF REGENTS ON BEHALF OF ARIZONA STATE UNIVERSITY, Tempe, AZ (US)

(72) Inventors: Paulo Shakarian, Tempe, AZ (US); Ruocheng Guo, Tempe, AZ (US); Elham Shaabani, Tempe, AZ (US); Abhinav Bhatnagar, Tempe, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 452 days.

(21) Appl. No.: 15/229,776

(22) Filed: Aug. 5, 2016

(65) Prior Publication Data

US 2017/0039305 A1    Feb. 9, 2017

Related U.S. Application Data

(60) Provisional application No. 62/201,517, filed on Aug. 5, 2015.

(51) Int. Cl.
| | |
|---|---|
| *G06F 17/50* | (2006.01) |
| *G06Q 10/04* | (2012.01) |
| *G06Q 10/10* | (2012.01) |
| *G06Q 50/00* | (2012.01) |

(52) U.S. Cl.
CPC ......... *G06F 17/5009* (2013.01); *G06Q 10/04* (2013.01); *G06Q 10/10* (2013.01); *G06Q 50/01* (2013.01); *G06F 2217/16* (2013.01)

(58) Field of Classification Search
None
See application file for complete search history.

(56) References Cited

U.S. PATENT DOCUMENTS

| | | | |
|---|---|---|---|
| 8,332,512 B1 | 12/2012 | Wu et al. | |
| 8,914,279 B1 | 12/2014 | Petrov et al. | |
| 9,031,888 B2 | 5/2015 | Lawrence et al. | |
| 2014/0237093 A1* | 8/2014 | Hofman | G06F 17/30861 709/223 |
| 2015/0379430 A1* | 12/2015 | Dirac | G06N 20/00 706/12 |
| 2016/0042284 A1* | 2/2016 | Menczer | G06Q 30/0202 706/46 |

FOREIGN PATENT DOCUMENTS

WO    2014159540 A1    8/2014

OTHER PUBLICATIONS

Zhang, Y., Wang, J., Wang, Y., & Zhou, L. (Jun. 2009). Parallel community detection on large networks with propinquity dynamics. In Proceedings of the 15th ACM SIGKDD international conference on Knowledge discovery and data mining (pp. 997-1006). (Year: 2009).*

(Continued)

*Primary Examiner* — Bijan Mapar
(74) *Attorney, Agent, or Firm* — Polsinelli PC

(57) ABSTRACT

Systems and methods for predicting order-of-magnitude viral cascades in social networks are disclosed.

18 Claims, 30 Drawing Sheets

(56) References Cited

OTHER PUBLICATIONS

E. Bakshy, J. M. Hofman, W. A. Mason, and D. J. Watts, "Everyone's an Influencer: Quantifying Influence on Twitter," in Proceedings of the Fourth ACM International Conference on Web Search and Data Mining, ser. WSDM '11. New York, NY, USA: ACM, 2011, pp. 65-74. [Online]. Available: http://dx.doi.org/10.1145/1935826.1935845.

J. Cheng, L. Adamic, P. A. Dow, J. M. Kleinberg, and J. Leskovec, "Can cascades be predicted?" in Proceedings of the 23rd international conference on World wide web. International World Wide Web Conferences Steering Committee, 2014, pp. 925-936.

J. Ugander, L. Backstrom, C. Marlow, and J. Kleinberg, "Structural diversity in social contagion," Proceedings of the National Academy of Sciences, vol. 109, No. 16, pp. 5962-5966, 2012.

X. L. Huang, M. Tiwari, and S. Shah, "Structural diversity in social recommender systems.", 5th ACM RecSys Workshop on Recommender Systems and the Social Web (RSWeb 2013). Hong Kong, China. 2013.

J. Zhang, B. Liu, J. Tang, T. Chen, and J. Li, "Social influence locality for modeling retweeting behaviors," in Proceedings of the Twenty-Third international joint conference on Artificial Intelligence. AAAI Press, 2013, pp. 2761-2767.

P. Shakarian, L. Gerdes, and H. Lei, "Circle-based tipping cascades in social networks," in WSDM Workshop on Diffusion Networks and Cascade Analytics, 2014.

R.-H. Li, L. Qin, J. X. Yu, and R. Mao, "Influential community search in large networks," Proceedings of the VLDB Endowment, vol. 8, No. 5, 2015.

M. Jenders, G. Kasneci, and F. Naumann, "Analyzing and predicting viral tweets," in Proceedings of the 22Nd International Conference on World Wide Web Companion, ser. WWW '13 Companion. Republic and Canton of Geneva, Switzerland: International World Wide Web Conferences Steering Committee, 2013, pp. 657-664. [Online]. Available: http://dl.acm.org/citation.cfm?id=2487788.2488017

V. D. Blondel, J.-L. Guillaume, R. Lambiotte, and E. Lefebvre, "Fast unfolding of communities in large networks," Journal of Statistical Mechanics: Theory and Experiment, vol. 2008, No. 10, p. P10008, 2008.

M. Rosvall and C. T. Bergstrom, "Maps of random walks on complex networks reveal community structure," Proceedings of the National Academy of Sciences, vol. 105, No. 4, pp. 1118-1123, 2008.

U. N. Raghavan, R. Albert, and S. Kumara, "Near linear time algorithm to detect community structures in large-scale networks," Physical Review E, vol. 76, No. 3, p. 036106, 2007.

L. Weng, F. Menczer, and Y.-Y. Ahn, "Predicting successful memes using network and community structure," in Eighth International AAAI Conference on Weblogs and Social Media, 2014.

H. Zhang, Q. Zhao, H. Liu, J. He, X. Du, H. Chen et al., "Predicting retweet behavior in weibo social network," in Web Information Systems Engineering-WISE 2012. Springer, 2012, pp. 737-743.

N. V. Chawla, K. W. Bowyer, L. O. Hall, and W. P. Kegelmeyer, "Smote: synthetic minority over-sampling technique," Journal of artificial intelligence research, vol. 16, No. 1, pp. 321-357, 2002.

P. Bao, H.-W. Shen, W. Chen, and X.-Q. Cheng, "Cumulative effect in information diffusion: empirical study on a microblogging network," PloS one, vol. 8, No. 10, p. e76027, 2013.

Q. Bao, W. K. Cheung, and Y. Zhang, "Incorporating structural diversity of neighbors in a diffusion model for social networks," in Web Intelligence (WI) and Intelligent Agent Technologies (IAT), 2013 IEEE/WIC/ACM International Joint Conferences on, vol. 1. IEEE, 2013, pp. 431-438.

X. Huang, H. Cheng, R.-H. Li, L. Qin, and J. X. Yu, "Top-k structural diversity search in large networks," Proceedings of the VLDB Endowment, vol. 6, No. 13, pp. 1618-1629, 2013.

D. Kempe, J. Kleinberg, and E. Tardos, "Maximizing the spread of influence through a social network," in Proceedings of the Ninth ACM SIGKDD International Conference on Knowledge Discovery and Data Mining, ser. KDD '03. New York, NY, USA: ACM, 2003, pp. 137-146. [Online]. Available: http://doi.acm.org/10.1145/956750.956769.

L. Gallos, S. Havlin, M. Kitsak, F. Liljeros, H. Makse, L. Muchnik, and H. Stanley, "Identification of influential spreaders in complex networks," Nature Physics, vol. 6, No. 11, pp. 888-893, Aug. 2010.

E. Lieberman, C. Hauert, and M. A. Nowak, "Evolutionary dynamics on graphs," Nature, vol. 433, No. 7023, pp. 312-316, Jan. 2005.

P. Shakarian, A. Aleali, A. Bhatnagar, R. Guo, and E. Shaabani, "Diffusion in Social Networks", pp. 1-101, Springer, 2015.

Guo, R., Shaabani, E., & Bhatnagar, A., "Toward Order-of-Magnitude Viral Cascade Prediction in Social Networks", In Proceedings of the 2015 IEEE/ACM International Conference on Advances in Social Networks Analysis and Mining 2015 pp. 1610-1615, 2015.

Sastry, N., Yoneki, E., & Crowcroft, J., "Buzztraq: predicting geographical access patterns of social cascades using social networks", In Proceedings of the Second ACM EuroSys Workshop on Social Network Systems (pp. 39-45), 2009.

\* cited by examiner

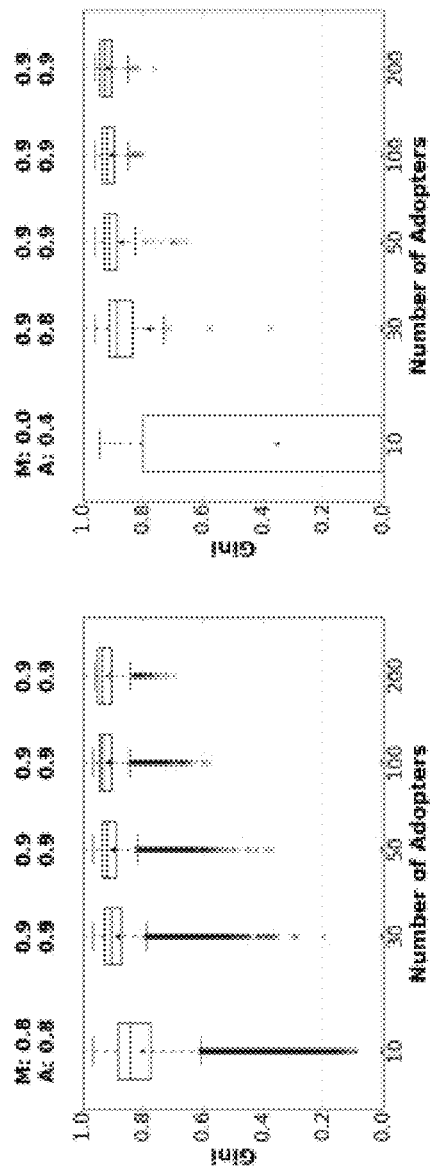

SYSTEMS AND METHODS FOR ORDER-OF-MAGNITUDE VIRAL CASCADE PREDICTION IN SOCIAL NETWORKS

CROSS REFERENCE TO RELATED APPLICATIONS

This is a non-provisional application that claims benefit to U.S. provisional application Ser. No. 62/201,517, filed on Aug. 5, 2015, and is herein incorporated by reference in its entirety.

FIELD

The present disclosure generally relates to order-of-magnitude viral cascade prediction in social networks, and in particular to systems and methods for a classification approach that predicts an order-of-magnitude viral cascade.

BACKGROUND

When a piece of information (microblog, photograph, video, link, etc.) starts to spread in a social network, an important question arises: will it spread to "viral" proportions—where "viral" is defined as an order-of-magnitude increase. However, several previous studies have established that cascade size and frequency are related through a power-law—which leads to a severe imbalance in this classification problem.

SUMMARY

Implementations of the present disclosure may take the form of a method, system, or computer process for processing information associated with social networks. The system may include a processing device a computer-readable medium associated with the processor and including instructions stored thereon and executable by the processor. The processor performs the method or computer process of generating a social network model comprising a plurality of nodes representing a plurality of users of a social network system and a plurality of edges representing connections between the plurality of users of the social network system, tracking an adoption through the social network model by the plurality of users of the social network system of a message posted to the social network system for a particular time frame, and predicting an order-of-magnitude viral cascade of the message in the social network system based on the tracking of the adoption through the social network model by the plurality of users of the social network system of a message posted to the social network system.

BRIEF DESCRIPTION OF THE DRAWINGS

FIG. 4A is a chart illustrating the gini impurity of non-adopters for non-viral cascades and FIG. 4B is a chart illustrating the Gini Impurity of non-adopters for viral cascades;

Corresponding reference characters indicate corresponding elements among the view of the drawings. The headings used in the figures do not limit the scope of the claims.

DETAILED DESCRIPTION

Figure 1A:
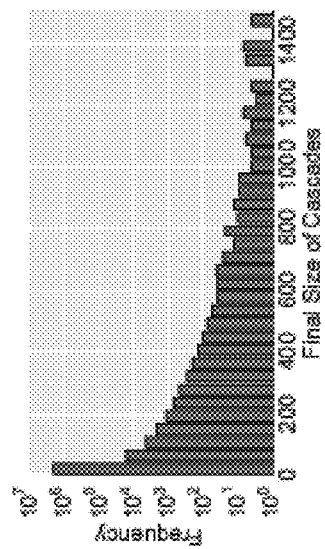
FIG. 1A is a chart illustrating network degree distribution.

In this disclosure, a system comprising a suite of measurements is devised based on "structural diversity" associated with the growth of a viral cascade in a social network. Structural diversity refers to the variety of social contexts in which an individual engages and is typically instantiated (for social networks) as the number of distinct communities represented in an individual's local neighborhood. Previously, a correlation has been identified between structural diversity and influence. These measures were demonstrated to be able to distinguish viral from non-viral cascades, despite the severe imbalance of the data for this problem. Further, these measurements were leveraged as features in a classification approach, successfully predicting microblogs that grow from 50 to 500 reposts. The system includes the following features:

A suite of structural diversity measurements for indicating cascade growth.

Identification of cascades of size 50 reposts that grow to 500 reposts with a precision of 0.69 and recall of 0.52 for the viral class (under 2% of the samples).

Identification of cascades that have advanced for 60 minutes that will reach 500 reposts with a precision of 0.65 and recall of 0.53 for the viral class (under 5% of the samples).

Demonstrating how to trade-off between precision and recall for the above-mentioned problems. For instance, to predict cascades that reach 500 nodes, a precision of 0.78 or recall of 0.71 is obtained at the expense of the other.

Results on the prediction of cascades rely solely upon the use of our structural diversity based measures for features and limited temporal features—hence the prediction is based on network topology alone (no content information was utilized). These results are achieved while maintaining the imbalances of the dataset—which is felt to better mimic reality. This differs from some previous studies which balance the data before conducting classification. Further, prediction of order-of-magnitude increases in the size of the cascade were obtained—which also differs from other work that focuses on identifying cascades that double in size.

II. Technical Preliminaries

A social network is represented as a graph $C=(V, E)$ where V is the set of vertices and E as set of directed edges that have sizes $|V|$, $|E|$ respectively. The intuition behind edge $(v, v')$ is that node v can influence v'. This intuition stems from how the edges are created in the network: $(v, v')$ is an edge if during a specified time period there is at least one microblog posted by v that is reposted by v' (we leave other thresholds beyond 1 repost to future work). It is assumed that a partition over nodes specify a community structure. It is assumed that a partition is static (based on the same time period from which the edges were derived) and that the partition C consists of k communities: $\{C1, C2, \ldots, C_k\}$. There are many possible methods to derive the communities (if user-reported communities are not available)—for instance: the Louvain Algorithm, Infomap, and Label Propagation. A Louvain algorithm is used to identify our communities in this disclosure due to its ability to scale.

Cascades.

For a given microblog $\theta$, the subset of nodes is denoted who originally posted or reposted $\theta$ within t time periods as $V_\theta^t$ and refer to them as adopters (at time t). Likewise, the set of reposting relationships within the same time period will be denoted $R_\theta^t$. Taken together, a cascade: $D_\theta^t=(V_\theta^t, R_\theta^t)$. Any valid original microblog $\theta$ could be contemplated as a unique identifier for a cascade. Given a microblog $\theta$, $v_\theta$ is the originator at instance $t_\theta^0$, which is defined as the origin time when the originator posted the microblog $\theta$ and time t is time since $t_\theta^0$. The $m^{th}$ repost of the microblog $\theta$ happens at time $t_\theta^0$. As m increases, a cascade accumulates nodes and edges over time. N is used to denote the final size of a cascade while the size of a cascade at any particular instance is the set of nodes present at that instance is simply $|v_\theta^t|$. For a given time t, the frontiers are referred to as the outgoing neighbors of the adopters in graph G who are not adopters themselves. Formally: $F_\theta^t = \{v \in V_n / V_\theta^t \text{ s.t.} \exists v_i \in V_\theta^t \text{ where } (v_i, v) \in E_n\}$. For nodes in G that are outside the adopters, the notation $t_{exp}(v, \theta, t)$ is used to denote the number of time units from the initial post of $\theta$ before the microblog was reposted by one of v's incoming neighbors—intuitively the time at which v was exposed to $\theta$. For a given natural number $\lambda$ (used to specify a time period), the $\lambda$ frontiers are defined as a subset of the frontiers that have been exposed to $\theta$ no earlier than $\lambda$ time units previously. Formally this set is defined as follows: $F_\theta^{t,\lambda} = \{v \in F_\theta^t | t_{exp}(v,\theta,t) \leq \lambda\}$. Finally, the complement of this set are the $\lambda$ Non-Adopters:

$$\overline{F}_\theta^{t,\lambda}\{v \in F_\theta^t | t_{exp}(v,\theta, t) > \lambda\}$$

Sina Weibo Dataset.

Figure 1B:
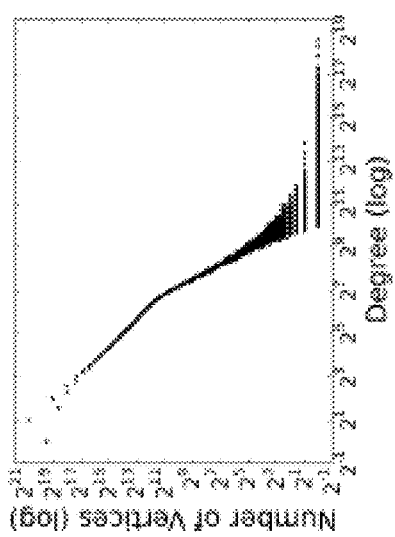
FIG. 1B is a chart illustrating a histogram of final size of all cascades in a dataset.
Figure 1C:
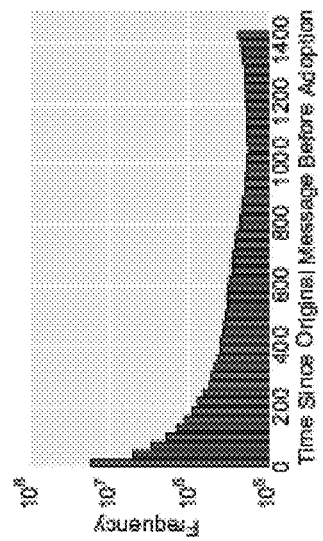
FIG. 1C is a chart illustrating a histogram of time that viral cascades took to become viral.
Figure 1D:
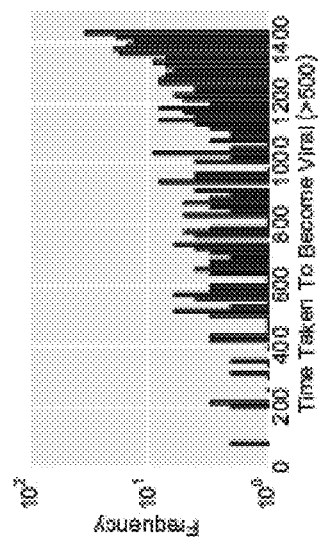
FIG. 1D is a chart illustrating a histogram of time that it took for one adoption to occur since the original message was published.

The dataset used was provided by WISE 2012 Challenge1. It included a sample of microblogs posted on Sina Weibo from 2009 to 2012. In this dataset, time and user information is provided for each post and subsequent repost which enables a corpus of cascades to be derived. From this data, a social network $G=(V, E)$ is derived that was created from microblogs (including original posts and reposts) that were published during the 3 month period between May 1, 2011 and Jul. 31, 2011. As expected, this network exhibits a power-law degree distribution (FIG. 1A). For this network, the number of active nodes in August (the time period studied for cascade prediction) is 5,910,608, while 5,664, 625 of them at least have one out-neighbor. During the month of August, there were 22,182,704 microblogs. Of these, 9,323,294 are reposts. 2,252,368 different microblogs succeeded to make at least one user repost, while 1,920,763 (86.6%) of them were written by authors who at least published one microblog during May 1, 2011 to Jul. 31, 2011 (the time period used to create the underlying network). The power-law relationship between cascade size and frequency was previously noted. The histogram of final size of cascades is displayed in FIG. 1B. This distribution mimics a power-law distribution which can demonstrate that this dataset is more representative of cascade behavior observed "in the wild". This differs significantly from work which conducts biased sampling to artificially provide balanced classes. $\lambda$ as 30 minutes was selected as 90% of all reposts in the initial 3 month period occurred in under this time (see FIG. 10). In FIG. 1C, distribution of viral cascade duration is shown—note that the average value here is 18 hours (which is significantly greater than studies in the time-based classification problem).

TABLE I

Properties of the Reposting Network and Cascades

| Properties | Reposting network |
|---|---|
| Vertices | 17,996,803 |
| Edges | 52,472,547 |
| Average degree | 5.83 |
| Average clustering coefficient | 0.107 |

TABLE I-continued

Properties of the Reposting Network and Cascades

| Properties | |
| --- | --- |
| Connected components | 4974 |
| Number of communities | 379,416 |
| Average size of communities | 47.5 |
| Cascade | |
| Number of cascades | 2,113,405 |
| Number of cascades over 500 | 208 |
| Number of nodes involved in the cascades | 5,910,608 |
| Average time of cascade to become viral | 18 (h) |

III. Structural Diversity Measurements

This section introduces a suite of various structural diversity measurements. These measurements are studied as cascades progress in Section IV and then leverage them as features for our classification problem in Section V. These measurements are as follows.

Number of Communities.

For $V' \subseteq V$, the associated communities $C(V')$ are the communities represented by $V'$. Formally: $C(V')=\{C_i \in C \text{ s.t. } V' \cap C_i \neq \emptyset\}$. The cardinality of this set (number of communities) will be denoted $K(V')$. The number of communities is measured represented by the above three populations of nodes: $K(V_\theta^t)$, $K(F_\theta^{t,\lambda})$, $K(F_\theta^{t,\lambda})$ observed at either a given time or given cascade size.

Gini Impurity.

For $V' \subseteq V$, the gini impurity, $I_G V'$ is the probability of a node in $V'$ being placed into the incorrect community if assigned a community based on the distribution of communities represented in $V'$. Formally:

$$I_G V' = 1 - \sum_i \left(\frac{|C_i \cap V'|}{|V'|}\right)^2.$$

The gini impurity of the adopters, $\lambda$ non-adopters, and $\lambda$ frontiers are studied for either a given time or cascade size: $I_G(V_\theta^t), I_G(F_\theta^{t,\lambda}), I_G(F_\theta^{t,\lambda})$. The intuition is to capture a notion of how the communities are distributed amongst the nodes in each of these sets with a single scalar value. The impurity of the adopter set $I_G(V_\theta^t)$ behaves similar to the entropy of this set. However, the impurity of the $\lambda$ frontiers will be a more discriminating feature.

Overlap.

For $V_a, V_b \subseteq V$, the overlap $(O(V_a, V_b))$ is simply the number of shared communities. Formally: $O(V_a, V_b)=|C(V_a) \cap C(V_b)|$. Overlap is studied between adopters and $\lambda$ frontiers, between adopters and $\lambda$ non-adopters, and between $\lambda$ frontiers and $\lambda$ non-adopters:

$$O(V_\theta^{t,m}, F_\theta^{m,\lambda}), O(V_\theta^{t,m}, \bar{F}_\theta^{m,\lambda}) \text{ and } O(F_\theta^{t,m}, \bar{F}_\theta^{m,\lambda})$$

respectively. The intuition with overlap stems directly from the original structural diversity results—for instance a high overlap between adopters and $\lambda$ frontiers will exhibit high structural diversity—hence increasing the probability of adoption.

Baseline Measures.

In addition to the aforementioned structural diversity measurements, two baseline measurements were measured dealing with time and size.

Average Time to Adoption.

The average time to adoption for the nodes in the current set of adopters (once the cascade grows to size m):

$$\frac{\sum_{i=1}^{m} t_\theta'}{m}.$$

Number of Nodes.

The cardinality of adopters, $\lambda$ non-adopters, and $\lambda$ frontiers $(|V_\theta^t|, |F_\theta^{t,\lambda}|, |F_\theta^{t,\lambda}|;$ observed at either a given time or a given cascade size.

IV. Structural Diversity Measurement Study

The behavior was examined of the various structural diversity measurements as viral and non-viral cascades progress. In this disclosure, a cascade is defined as viral if the number of reposts reaches a threshold (denoted TH) of 500 (other settings are explored for TH when describing classification results). Snapshots of the cascades were examined as they progress both in terms of size (denoted m) and time (denoted t). Table II shows the number of samples the analysis covers in both classes for each stage of diffusion. For each time stamp t analysis on features is performed for those Cascades with no less than 5 adopters at the time so that the cascade can provide enough information from its structure for the prediction task. For each size m the Cascades with $V_\theta^t=m$ adopters at some time $t_\theta^m$, $t_\theta^m$ can vary for different $\theta$. Hence, cascades with final size $N<m$ were ignored in the analysis task. This leads to a decrease in the number of non-viral Cascades as m increases. A total of 24 measurements discussed above (12 for time-based analysis and 12 for size-based analysis). For each measurement, at each stage of the diffusion process, a statistical significance is identified between viral and non-viral classes. KS tests are performed for each pair of measurements. In every test, $p \leq 10^{-13}$, so the null hypothesis is rejected for all cases, which means each pair of the distributions are significantly different. The KS test was chosen over T test and Chi-square test as it is sensitive to both the location and shape of the distribution as well as it does not require each distribution to cover all possible values of the other.

TABLE II

Number of samples analyzed in different stages

| | Samples | Viral Samples (%) |
| --- | --- | --- |
| m | | |
| 10 | 98,832 | 0.2% |
| 30 | 26,733 | 0.7% |
| 50 | 13,285 | 1.5% |
| 100 | 4,722 | 4.2% |
| 200 | 1,324 | 15% |
| t (min) | | |
| 40 | 2,234 | 7% |
| 60 | 3,444 | 5% |
| 100 | 5,767 | 3% |
| 150 | 8,349 | 2% |
| 300 | 15,350 | 1% |

A. Size Progression

Average Time to Adoption.

Figures 2A, 2B:
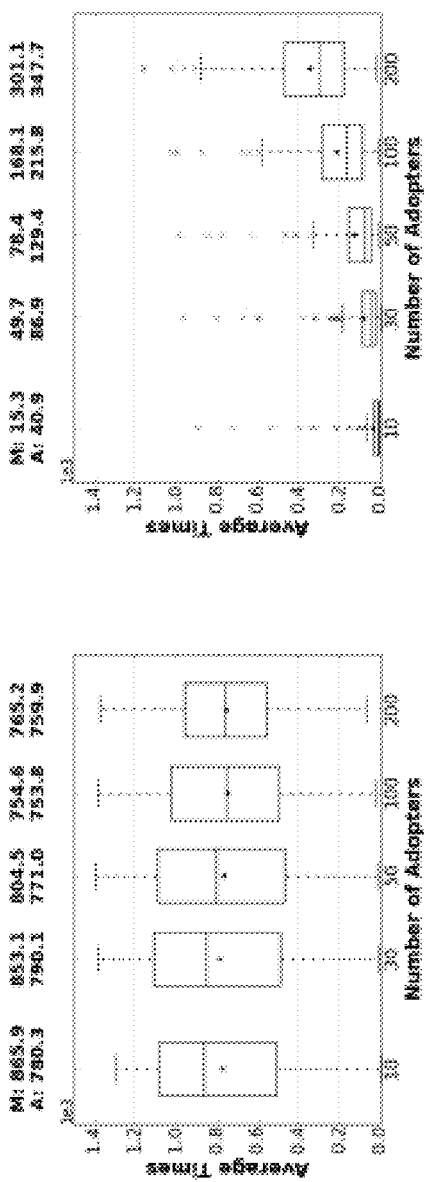
FIG. 2A is a chart illustrating the average time for each adoption for non-viral cascades.
FIG. 2B is a chart illustrating the average time for each adoption for viral cascades.
Figure 3B:
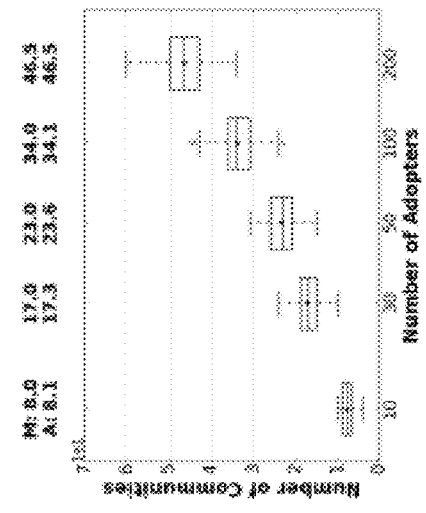
FIG. 3B is a chart illustrating the number of communities amongst adopters for viral cascades.
Figure 3D:
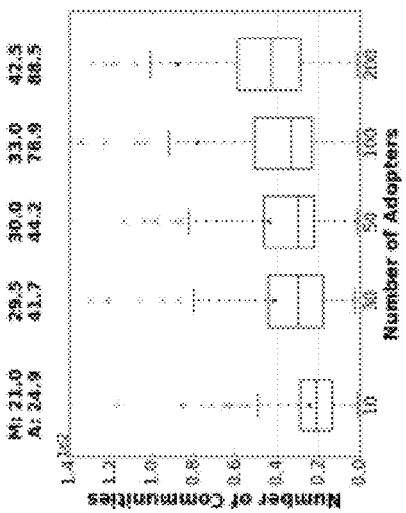
FIG. 3D is a chart illustrating the number of communities amongst frontiers for viral cascades.
Figure 3A:
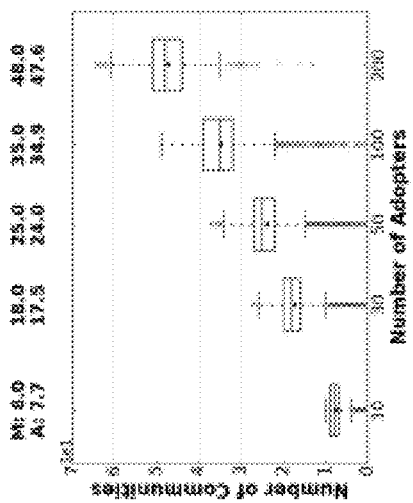
FIG. 3A is a chart illustrating the number of communities amongst adopters for non-viral cascades.
Figure 3C:
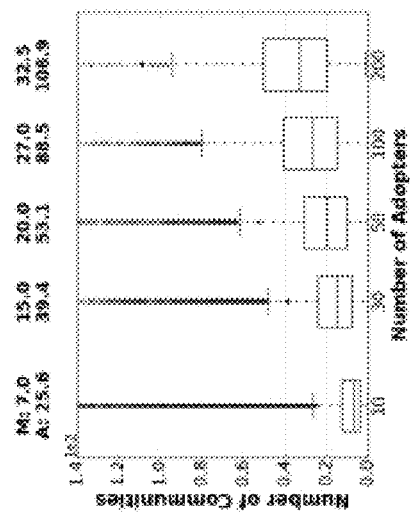
FIG. 3C is a chart illustrating the number of communities amongst frontiers for non-viral cascades.

As a baseline measurement, the average time to adoption was studied for each size-based stage of the cascade process (FIGS. 2A and 2B). As expected, viral cascades exhibit a faster rate of reposting. While it was noted that significant differences are present—especially in the early stages of the cascade, the whiskers of the non-viral class indicate a significant proportion of non-viral cascades that exhibit rapid adoption. This is likely due to the fact that certain cascades may have very high appeal to specialized communities.

Number of Communities.

FIGS. 3A through 3D display how the number of communities $K(V^1)$ increases over $m=\{10, 30, 50, 100, 200\}$ for the sets $V'=\{V_\theta^t, F_\theta^{t,\lambda}\}$. It is noted that $K(V_\theta^t)$ (the communities represented in the set of adopters) was shown to be a useful feature for tasks where the target class had fewer reposts than in this study. Here, while statistically significant differences exist, the average and median values at each of the examined stages are generally similar. On the other hand, the communities represented by the set of $\lambda$ frontiers $$\left(K\left(F_\theta^{t_\theta^m,\lambda}\right)\right)$$

) show viral Cascades have stronger capability than non-viral ones to keep a diverse set of $\lambda$ frontiers. The medical of $$K\left(F_\theta^{t_\theta^m,\lambda}\right)$$

(not pictured) shows viral cascades start with smaller $K(F_\theta^{t_\theta^m,\lambda})$. However, it increases faster in viral cascades as nodes in $\lambda$ frontiers becomes $\lambda$ non-adopters.

Gini Impurity.

Cascades in both classes tend to accumulate diversity in the process of collecting more adopter—and a related entropy measure performed similarly. It was noted (not pictured) that in the early stages, viral cascades can show more diversity in $\lambda$ frontiers measured by $$I_G\left(F_\theta^{t_\theta^m,\lambda}\right)$$

in early stages ($m=\{10, 30, 50\}$). But, perhaps most striking, that non-viral Cascades gain more uniformly distributed nodes over communities in $\lambda$ non-adopters, shown by $I_G(\overline{F}_\theta^{t_\theta^m,\lambda})$ (FIGS. 4A and 4B). This is due to non-viral cascades likely have an appeal limited to a relatively small number of communities—hence those not adopting the trend may represent a more diverse set of communities.

Overlap.

Figure 5A:
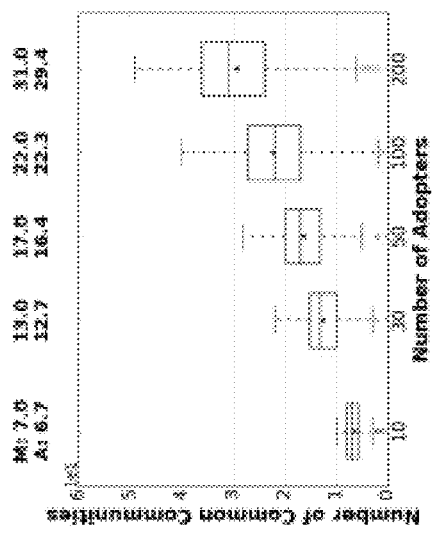
FIG. 5A is a chart illustrating the overlap of adopters and frontiers for non-viral cascades.
Figure 5B:
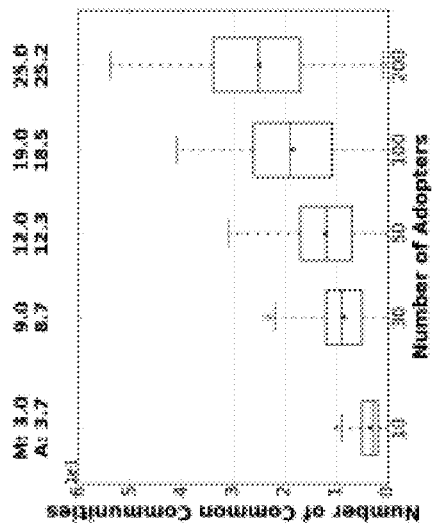
FIG. 5B is a chart illustrating the overlap of adopters and frontiers for viral cascades.

It was found that overlap grows with the number of adopters in the three types of overlap considered. For $$O\left(V_\theta^{t_\theta^{m-}}, F_\theta^{t_\theta^m}\right),$$

viral cascades start with a larger initial value and keep leading non-viral ones in the diffusion process of frist 200 noes (FIGS. 5A and 5B). This may hint that viral cascades also take advantage of the densely linked communities to help them become viral. However, in the case of $$O\left(V_\theta^{t_\theta^m}, \overline{F}_\theta^{t_\theta^m}\right) \text{ and } O\left(F_\theta^{t_\theta^m,\lambda}, \overline{F}_\theta^{t_\theta^m,\lambda}\right),$$

viral cascades begin with lower value but grow much faster than non-viral Cascades.

B. Time Progression

Number of Adopters.

Figure 6B:
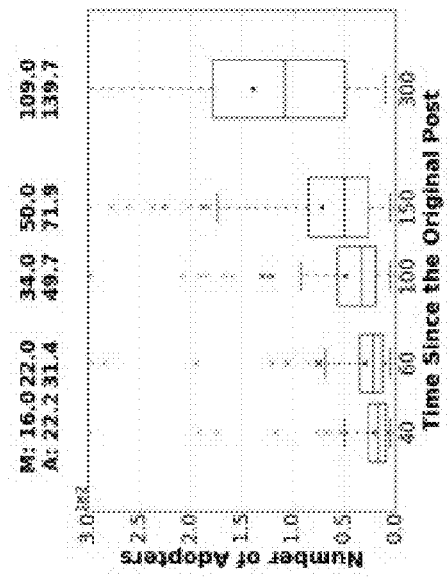
FIG. 6B is a chart illustrating the number of adopters for viral cascades.
Figure 6A:
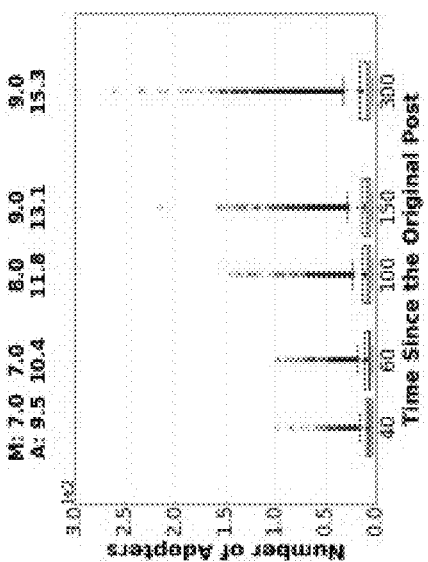
FIG. 6A is a chart illustrating the number of adopters for non-viral cascades.
Figure 7B:
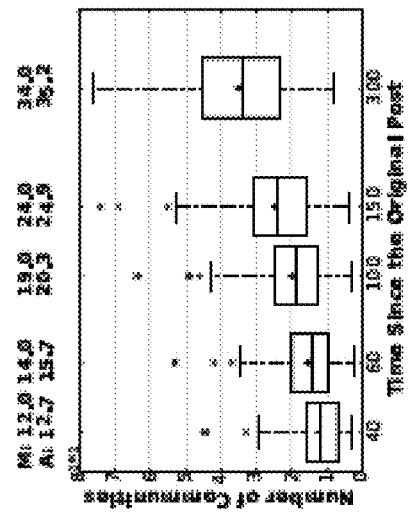
FIG. 7B is a chart illustrating the number of communities amongst adopters for viral cascades.
Figure 7D:
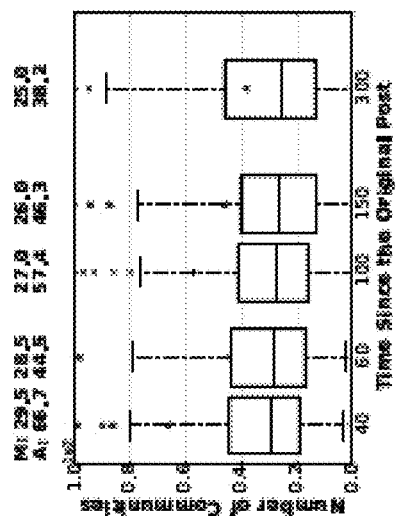
FIG. 7D is a chart illustrating the number of communities amongst frontiers for viral cascades.
Figure 7A:
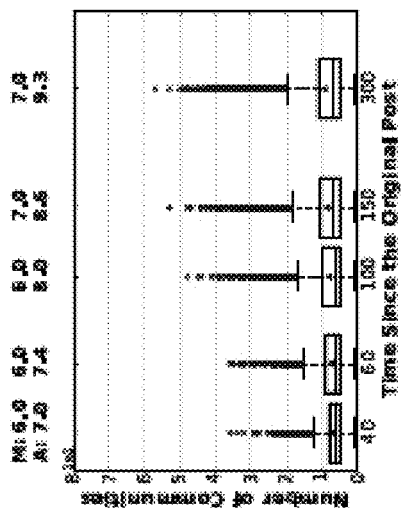
FIG. 7A is a chart illustrating the number of communities amongst frontiers for viral cascades.
Figure 7C:
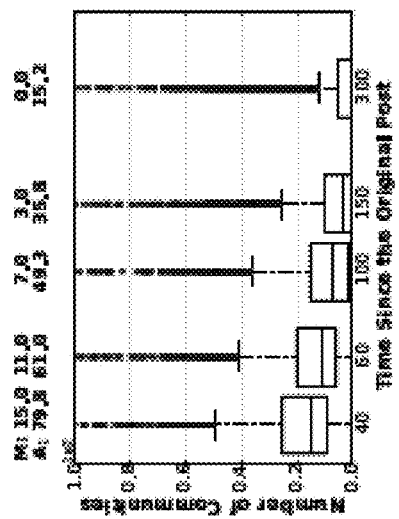
FIG. 7C is a chart illustrating the number of communities amongst frontiers for non-viral cascades.

As a baseline measurement, the number of adopters was studied at regular time intervals, and as expected, found a clear difference between the two classes. FIGS. 6A and 6B show how $|V_\theta^t|$ changes over $t=\{40, 60, 100, 150, 300\}$. Although there is an obvious difference in early stages (40-60 minutes) between the two distributions, it will be shown in the next section that this alone does not provide adequate performance for our prediction task (see Section V).

Nature of Communities.

FIGS. 7A through 7D show how $K(V')$ for $V'=\{V_\theta^t, F_\theta^{t,\lambda}\}$ changes over time. The value of $K(V')$ increased over time for $V_\theta^t$ and $\overline{F}_\theta^{t,\lambda}$ but decreased for $F_\theta^{t,\lambda}$. Here, the differences are somewhat more pronounced than for the size-progression measurements (compare with FIGS. 3A through 3D). Viral Cascades are more likely to have more communities in any one of $$V_\theta^t, F_\theta^{t,\lambda}, \overline{F}_\theta^{t,\lambda}$$

than non-viral ones. For adopters and $\lambda$ non-adopters, $K(V_\theta^t)$ and $K(\overline{F}_\theta^{t,\lambda})$ value of viral cascades increases faster than that of non-viral ones over time. While for $\lambda$ frontiers, $K(F_\theta^{t,\lambda})$ of non-viral cascades decreases more than viral ones in the same amount of time.

Gini Impurity.

Figure 8B:
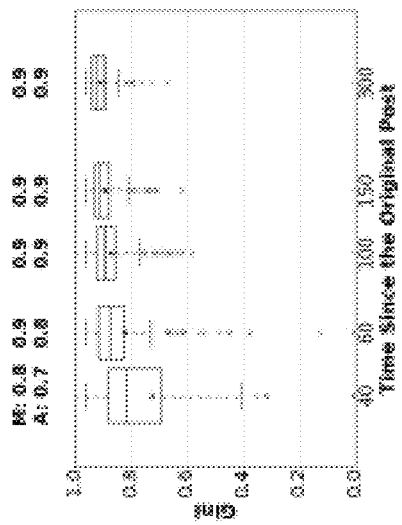
FIG. 8B is a chart illustrating the gini Impurity for viral cascades.
Figure 8A:
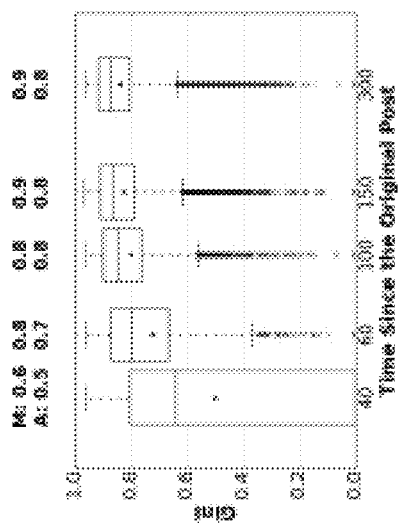
FIG. 8A is a chart illustrating the gini impurity of non-adopters for non-viral cascades.

It takes less than $\lambda=30$ minutes for a considerable portion of viral cascades to reach $m \in \{10, 30\}$. This explains why gini impurity values $$I_G(\overline{F}_\theta^{t_\theta^m,\lambda})$$

of viral cascades are smaller than those of non-viral cascades when m is quite small (compare FIGS. 4A and 4B with FIGS. 8A and 8B). As m increases, although the median and average cannot show any difference for $$I_G(\overline{F}_\theta^{t_\theta^m,\lambda}),$$

FIGS. 4A and 4B show non-viral cascades are more likely to have a value smaller than the lower whisker to become outliers.

Overlap.

Figure 9A:
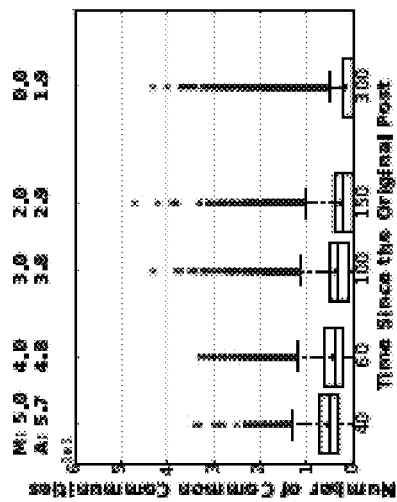
FIG. 9A is a chart illustrating the overlap of adopters and frontiers for non-viral cascades.
Figure 9B:
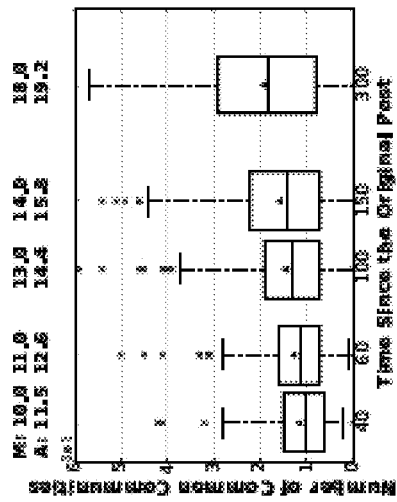
FIG. 9B is a chart illustrating the overlap of adopters and frontiers for viral cascades.

It was found that overlap $O(V_\theta^t, F_\theta^{t,\lambda})$, $O(V_\theta^t, \overline{F}_\theta^{t,\lambda})$ and $O(V_\theta^t, \overline{F}_\theta^{t,\lambda})$ manifest an obvious difference between viral and non-viral cascades by values and trend over time. For instance, in FIGS. 9A and 9B, growth of $O(V_\theta^t, F_\theta^{t,\lambda})$ was seen for the viral cascades as compared to the non-viral class. In fact, over time, this value decreases for non-viral cascades as the set of A frontiers fades away for non-viral cascades with time.

V. Classification Experiments

Experiments for predicting whether a cascade becomes viral were conducted—when a size threshold (TH) exceeded 500 adopters given that either the cascade has 50 adopters (s=50) or has progressed for an hour (t=60). These are referred to these as size-based and time-based prediction problems. Based on the distribution of final size of cascades in this dataset (see FIG. 1B), this is a binary classification task with two heavily imbalanced classes. Hence, performance measurements (precision, recall. and F1 score) were reported for only the minority (viral) class. Throughout the course of these experiments, it was found that varying threshold (slightly modifying the definition of "viral") for only the training set allows for a trade-off between precision and recall. The trend of performance measures were studied in two cases:

The threshold for test set is maintained as $TH_{ts}=500$ while the training threshold was varied $TH_{tr}=\{300, 400, 500, 600, 700\}$.

The two thresholds are kept as the same TH while this value TH=$\{300, 400, 500, 600, 700\}$ was modified.

Table III shows the groups of features used in the prediction tasks. The features are groups $A_m$ (size-based) and $A_t$ (time-based). As a baseline method for size-based prediction (feature group $C_m$) average time to adoption was used, while a cascade size was used as the baseline for the time-based prediction (feature group $C_t$). Features (Group $A_t$, $A_m$) were compared with the community features (Group $B_t$,$B_m$). This was the best performing feature set for a comparable task.

TABLE III

Features: Cascade Prediction over Time and Size

| Group | Feature(s) over size |
|---|---|
| $A_m$ | $K(F_\theta^{t\theta^m, \lambda}), K(\overline{F}_\theta^{t\theta^m, \lambda}),$ $I_G(V_\theta^{t\theta^m}), I_G(F_\theta^{t\theta^m, \lambda}), I_G(\overline{F}_\theta^{t\theta^m, \lambda}),$ $O(V_\theta^{t\theta^m}, F_\theta^{t\theta^m, \lambda}), O(V_\theta^{t\theta^m}, \overline{F}_\theta^{t\theta^m, \lambda}),$ $O(F_\theta^{t\theta^m, \lambda}, \overline{F}_\theta^{t\theta^m, \lambda}),$ $\|F_\theta^{m, \lambda}\|, \|\overline{F}_\theta^{m, \lambda}\|, \frac{\sum_{i=1}^m t_\theta^i}{m}$ for size m ∈ {30, 50} |
| $B_m$ | Community Features Mentioned in {12} and $\frac{\sum_{i=1}^m t_\theta^i}{m}, m = 50$ |
| $C_m$ | $\frac{\sum_{i=1}^m t_\theta^i}{m}, m = 50$ |

| Group | Feature(s) over time |
|---|---|
| $A_t$ | $K(F_\theta^{t, \lambda}), K(\overline{F}_\theta^{t, \lambda}),$ $I_G(V_\theta^t), I_G(F_\theta^{t, \lambda}), I_G(\overline{F}_\theta^{t, \lambda}),$ $O(V_\theta^t, F_\theta^{t, \lambda}), O(V_\theta^t, \overline{F}_\theta^{t, \lambda}), O(F_\theta^{t, \lambda}, \overline{F}_\theta^{t, \lambda}),$ $\|V_\theta^t\|, \|F_\theta^{t, \lambda}\|, \|\overline{F}_\theta^{t, \lambda}\|$ for time t ∈ {40, 60} (min) |
| $B_t$ | Community Features Mentioned in {12} and $\|V_\theta^t\|$, t = 60 (min) |
| $C_t$ | $\|V_\theta^t\|$, t = 60 (min) |

Additionally, the average size of recalled and non-recalled viral cascades by classifiers using features in groups $A_t$ and $A_m$ was studied. The significance and performance of individual and certain combinations of features was also investigated.

A. Cascade Prediction Results

A ten-fold cross-validation was used in the experiments to ensure the results did not take any advantage of randomness in picking training and testing sets. First the prediction tasks were carried out with fixed thresholds $TH_{tr}=500$, $TH_{ts}=500$. Then the training threshold $TH_{tr}=\{300, 400, 500, 600, 700\}$ was modified to show how this achieves a tradeoff between precision and recall. The difference in average final size between correctly classified viral cascades and incorrectly classified ones was also monitored over $TH_{tr}=\{300, 400, 500, 600, 700\}$ to show the potential to predict exact number of adopters by features in $A_t$ and $A_m$. Furthermore, the threshold of both training and testing sets TH=$\{300, 400, 500, 600, 700\}$ was modified to show the robustness of these features on related classification problems. The over-sampling method SMOTE was used with random forest classifier to generate synthetic samples for the viral class. Other, lesser performing classifiers were also examined (including SVM, MLP, and other ensemble methods) and are not reported here. All results shown in this section is a sample mean produced by repeated experiments (10 times) under each combination of variables. Error bars represent one standard deviation.

Size-Based Prediction.

Figure 10:
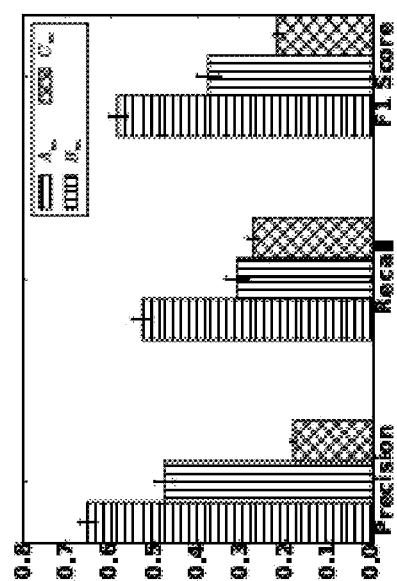
FIG. 10 is a chart illustrating classification results based on groups of extracted features.
Figures 11A, 11B:
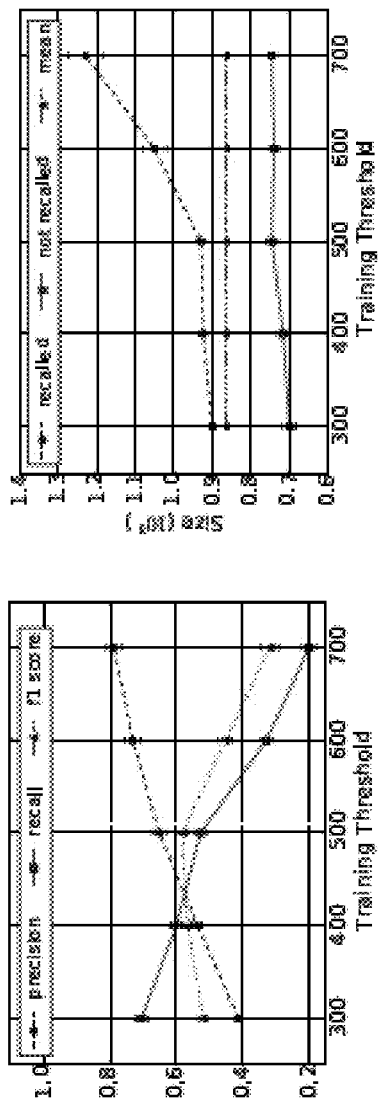
FIG. 11A is a chart illustrating precision, recall and F1 score for different training thresholds.
FIG. 11B is a chart illustrating average final size of viral cascades.
Figures 12A, 12B:
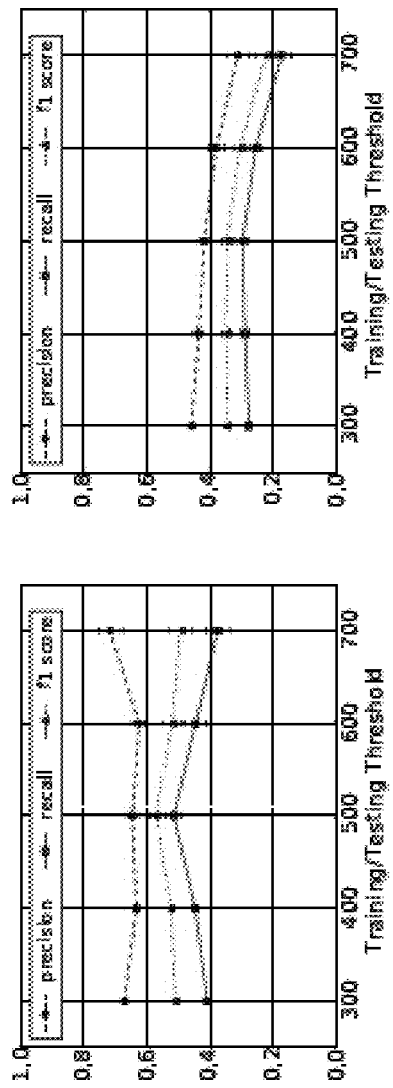
FIG. 12A is a chart illustrating classification results for features in group $A_m$ and FIG. 12B is a chart illustrating classification results for features in group $B_m$.

Cascades of size 50 that reached 500 were studied for this task. There were 13,285 cascades that reached the size m=50 while 200 out of them reached the size of 500. Maintaining the threshold TH=500, FIG. 10 shows random forest classifier trained with features in group $A_m$ can outperform the other groups. The trade-off between precision and recall can be achieved by changing the training threshold $TH_{tr}$ while maintaining the testing threshold (FIGS. 11A and 11B). It was also noted that the average final size of viral cascades recalled by the classifier increased with the training threshold. With threshold TH=$\{300, 400, 500, 600, 700\}$ on both training and testing samples, the features introduced in this disclosure ($A_m$) consistently outperform those previously introduced ($B_m$)—see FIGS. 12A and 12B.

Time-Based Prediction.

Figure 13:
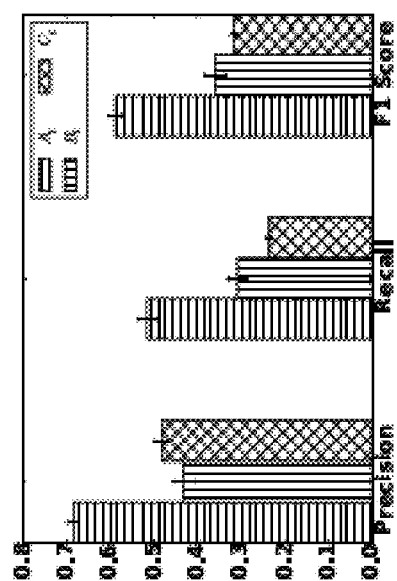
FIG. 13 is a chart illustrating classification results based on groups of features $(A_t, B_t, C_t)$ extracted when t=60 for fixed $TH_{tr}$=500, $TH_{ts}$=500.
Figure 14B:
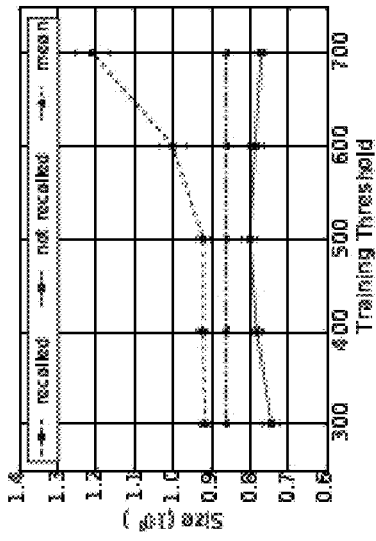
FIG. 14B is a chart illustrating the average final size of viral cascades.
Figure 14A:
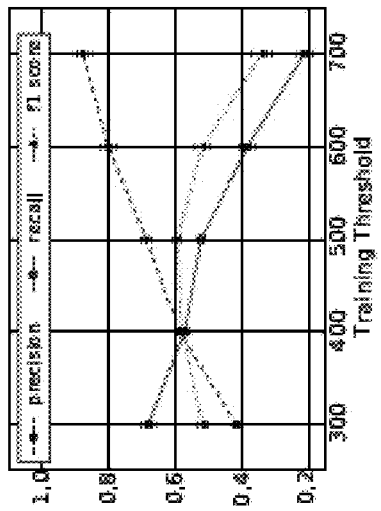
FIG. 14A is a chart illustrating precision, recall, and F1 score for different training thresholds.
Figure 15B:
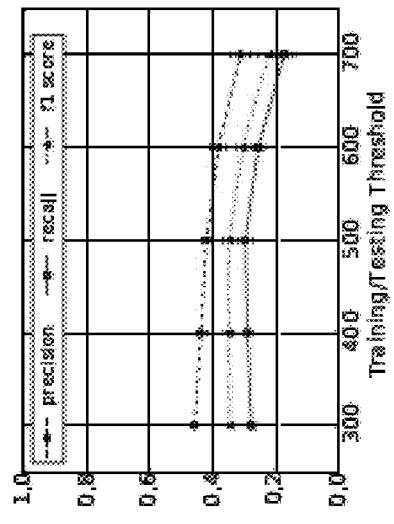
FIG. 15B is a chart illustrating classification results features in group $B_t$.
Figure 15A:
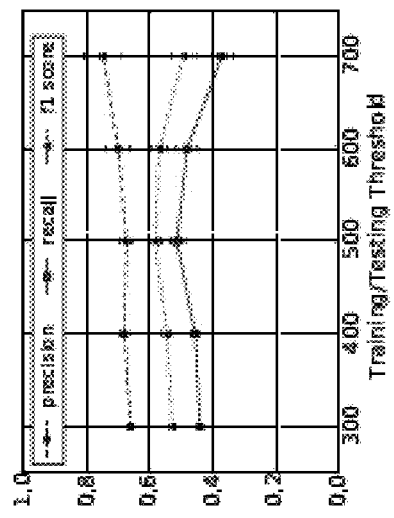
FIG. 15A is a chart illustrating classification results for features in group $A_t$.

As shown in Table II, there are 3.444 cascades in the dataset that reached the size of m=5 within 60 (min) with only 5% from the minority class. When the threshold is kept as TH=500 for both training and testing set, the results obtained are shown in FIG. 13 again showing that the features introduced in this disclosure ($A_t$) outperform the other feature sets in terms of recall, precision and F1 score. By modifying threshold for training samples only, two phenomena were discovered. First, a trade-off between precision and recall can be manipulated by controlling the value of $TH_{tr}$. This is shown in FIG. 14A. Second, as shown in FIG. 14B, with $TH_{tr}$ increasing, the average final size of correctly recalled viral cascades also grew. Furthermore, the threshold for training and testing sets together was modified to show the reliability of features in group $A_t$ is better than ones in $B_t$ (See FIGS. 15A and 15B).

B. Feature Investigation

The importance of each feature in $A_t$ and $A_m$ was investigated. With $TH_{tr}=500$ and $TH_{ts}=500$, 200 randomized logistic regressions models (100 for $A_m$ and 100 for $A_t$) were trained—each assigning weights to the features in those sets. The features were then categorized with weight larger than 0.01 (on average) into groups such as overlap, gini impurity etc. Then, classification on the basis of single feature categories or combination of such categories was performed.

Figure 16A:
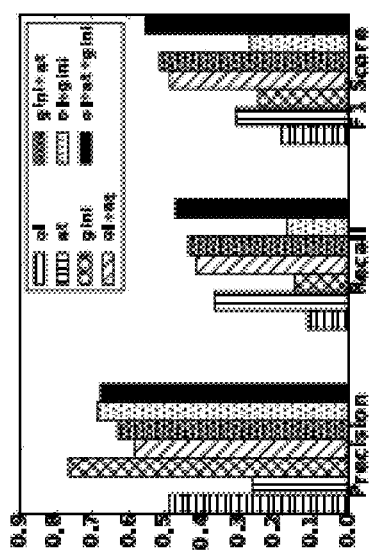
FIG. 16A is a chart illustrating the classification results for subsets of $A_m$.
Figure 16B:
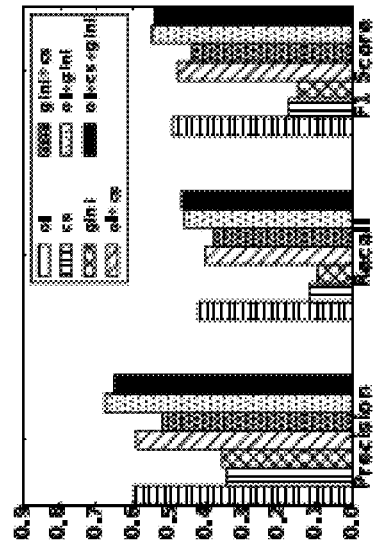
FIG. 16B is a chart illustrating the classification results for subsets of $A_t$.
Figure 17B:
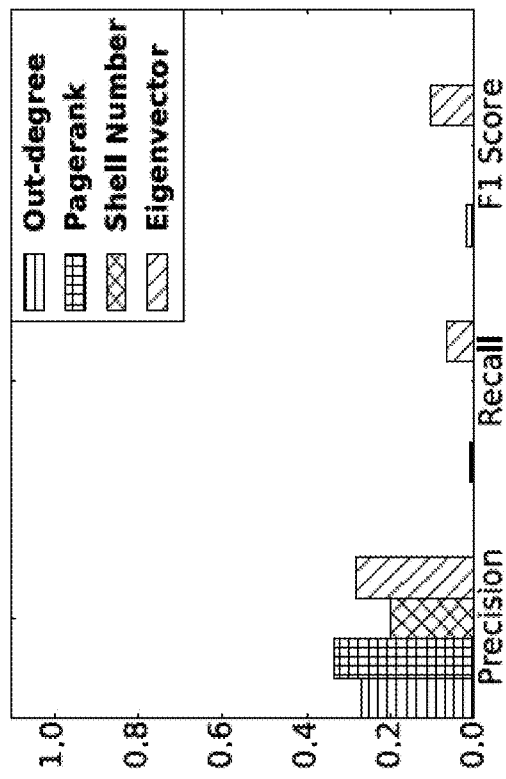
FIGS. 17A-17F are graphs showing classification results of centrality based methods.
Figure 17A:
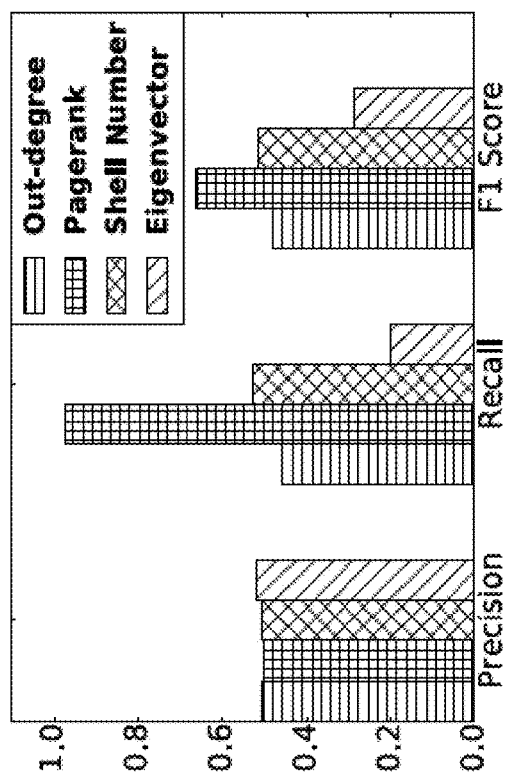
Figure 17D:
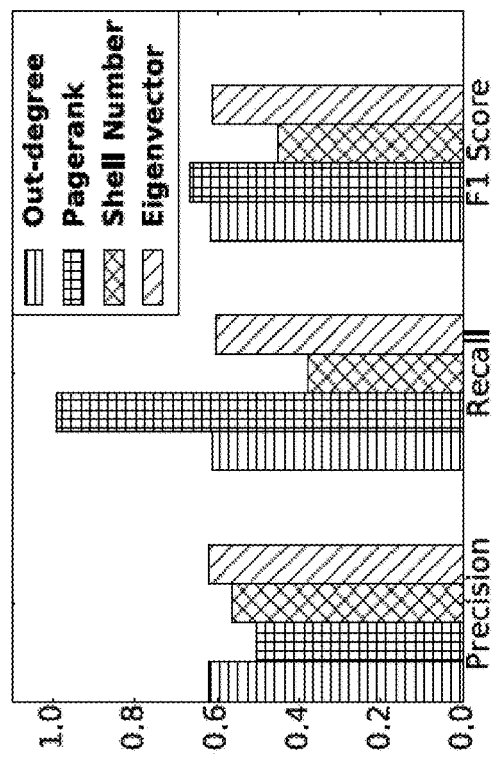
Figure 17C:
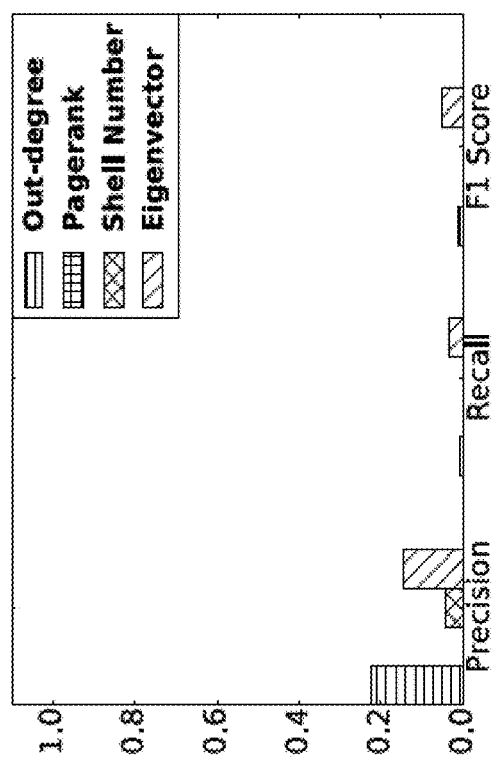
Figure 17F:
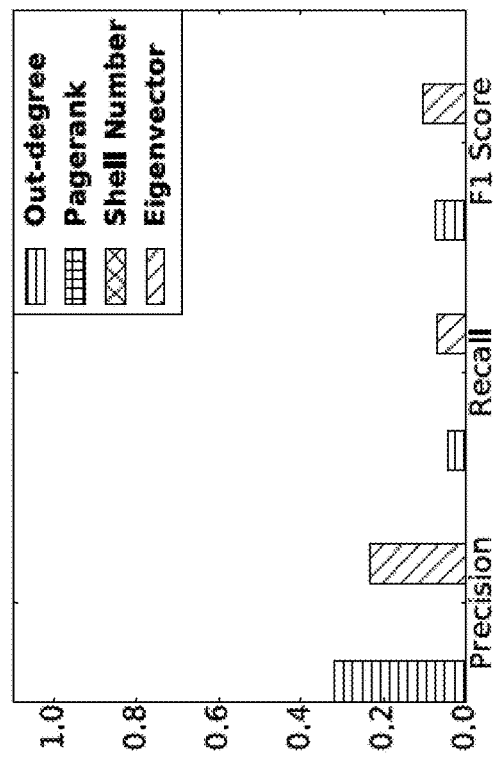
Figure 17E:
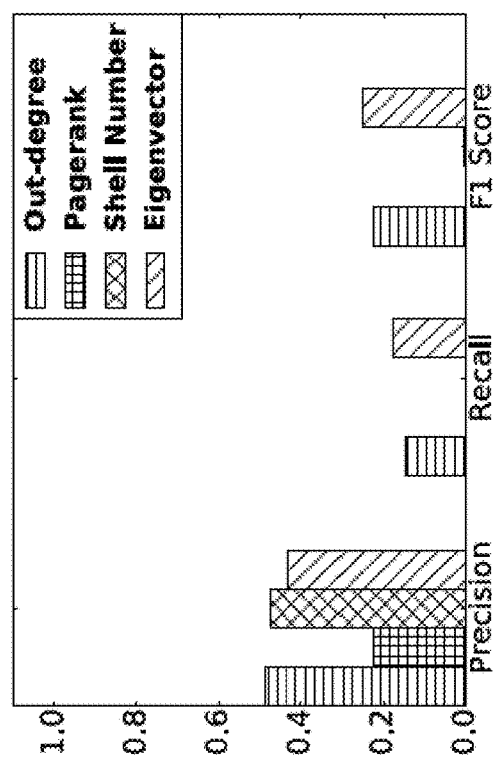

The average weights assigned are shown in Table IV while classification results are depicted in FIGS. 16A and 16B. As shown by these results, overlaps can make significant contribution to cascade prediction. Intuitively, communication between two sets of nodes is more likely to happen in their shared communities. This implies that the larger overlap value, the more influence of one set on the other. For example, it can be inferred that viral cascades tend to have larger $O(V_\theta', F_\theta^{t,\lambda})$ value for adopters have larger chance to influence the $\lambda$ frontiers than non-viral cascades. FIGS. 5A and 5B and FIGS. 9A and 9B provide evidence of this phenomenon.

TABLE IV

Weights of features assigned by randomized logistic regression models

| Group Name | Features ($A_m$) | Weights | Features ($A_t$) | Weights |
|---|---|---|---|---|
| Gini | $I_G(F_\theta'^{50}_{50})$ | 0.0204 | $I_G(V_\theta^{60})$ | 0.0389 |
| Impurity | $I_G(F_\theta'^{30}_{30})$ | 0.02125 | $I_G(V_\theta^{40})$ | 0.04905 |
|  | $I_G(F_\theta'^{30}_{30})$ | 0.52065 | $I_G(F_\theta^{40,\lambda})$ | 0.3313 |
| Overlap | $O(V_\theta'^{30}, F_\theta'^{30}_{30}, \lambda)$ | 0.5034 | $O(V_\theta^{60}, F_\theta^{60,\lambda})$ | 0.2698 |
|  | $O(V_\theta'^{30,\lambda}, F_\theta'^{30}_{30})$ | 0.0365 | $O(V_\theta^{60}, F_\theta^{60,\lambda})$ | 0.53815 |
|  | $O(F_\theta'^{30}_{50}, F_\theta'^{50}_{50})$ | 0.22715 | $O(F_\theta^{60,\lambda}, F_\theta^{60,\lambda})$ | 0.40895 |
|  | $O(V_\theta'^{50,\lambda}, F_\theta'^{50}_{50,\lambda})$ | 0.49775 | $O(V_\theta^{40}, F_\theta^{30,\lambda})$ | 0.62755 |
|  | $O(F_\theta'^{50,\lambda}, F_\theta'^{50,\lambda})$ | 0.2572 | $O(V_\theta^{40,\lambda}, F_\theta^{40,\lambda})$ | 0.53835 |
|  |  |  | $O(F_\theta^{40,\lambda}, F_\theta^{40,\lambda})$ | 0.28765 |
| Baseline | $\frac{\sum_{i=1}^{50} t_\theta^i}{50}$ | 1.0 | $|V_\theta^{60}|$ | 0.0723 |

Definitions

Network and Cascade:

The social network is a directed graph $G=(V, E)$ where each node $v \in V$ represents a user and each edge $e_{ij}=(v_i, v_j)$ denotes that user $v_i$ is followed by user $v_j$. Identified by the original message or the corresponding hashtag, a cascade is a time-variant subgraph of the social network $d(t)=(V(t), E(t))$. Each node $v \in V(t)$ denotes a user reposted the original message of cascade $d(t)$ (for the Aminer dataset) or a user posted the hashtag defining cascade $d(t)$ (for the Twitter dataset) within time t. The time variable t denotes number of time units since the microblog including the original message or the hashtag. For each node $v \in V(t)$ we record their adoption time of cascade $d(t)$ as $t_v$. For $v \in V(t)$, $t_v \leq t$ while for $v \notin V(t)$ we define $t_v = \infty$. Thus, an ascendingly sorted vector $t_v(t)$ is obtained including all $t_v \leq t$ for each cascade, which plays an important role in both feature based methods and point process based methods for cascade prediction. For convenience, we use $t_{end}$ to denote the time when the last adoption of a cascade happened.

Besides the cascade $d(t)=(V(t), E(t))$, the neighborhood of $V(t)$ also can provide information about the potential of the cascade. Here the out-neighborhood is defined that is reachable by any node in $V(t)$ in step i as ith surface $F_i(t)$. To show how 'fresh' the cascade is for a node $v \in F_i(t)$, a function $f_{\Delta t}$: $v \to \Delta t$ is defined that maps such a node to the number of time units since v become a member of first surface to current time t. As time makes a big difference in social influence and diffusion, the first surface $F_1(t)$ is divided into two sets of nodes depends on $f_{\Delta t}(v)$ for all $v \in F_1(t)$. With a selected threshold $t_\lambda$. The first set named as frontiers includes all nodes $v \in F_1(t)$ such that $f_{\Delta t}(v) > t_\lambda$ and the other set non-adopters consists the other nodes $v \in F_1(t)$ such that $f_{\Delta t}(v) > t_\lambda$.

In this disclosure, $|x|$ denotes absolute value of scaler x and $|x|$ denotes cardinality of set x.

Communities:

A community partition of a social network is treated as a function $f_c$: $V \to C$ which maps a set of nodes V to a set of communities C. With this function, given a cascade $d(t) = (V(t), E(t))$, it enables us to describe the distribution of nodes over communities by features such as $|f_c(V)|$, the number of communities among set V.

Point Process:

Each adoption in a cascade can be represented as an event from the aspect of point process. Thus, for cascade prediction, $t_v(t-\Delta t)$ is used to describe the history of a point process strictly before t. The core of a point process is the conditional density function $\lambda(t)$. Conditioned on $t_v(t-\Delta t)$, the conditional density is the limit of expected number of adoptions would happen in time interval $[t, t+\Delta t]$ by taking $\Delta t \to 0+$:

$$\lambda(t) = \lim_{\Delta t \to 0^+} E\{|V(t+\Delta t)| - |V(t)|\} \quad (1)$$

Given the density function $\lambda(t)$ and target prediction time t', the predicted cascade size can be computed by:

$$|V(t')| = |V(t)| + \int_t^{t'} \lambda(\tau) d\tau \quad (2)$$

Problem Statement

In this disclosure, a comparison of different methods is focused on which can solve the cascade prediction problem. This problem can be formulated as either a regression problem or a classification problem:

Regression Problem:

Given an early stage cascade $d(t)=(V(t), E(t))$ and the corresponding node attribute vector $t_v(t)$ with constraint $|V(t)|=n$, the target is to predict the final size of the cascade $|V(t_{end})|$.

Classification Problem:

A threshold Thres is selected to label each cascade. For a given cascade if its $|V(t_{end})| \geq$ Thres, we define it as a viral sample labeled as 1, otherwise, we label it as non-viral labeled as 0. Then the problem is to classify a given cascade $d(t)$ to the viral class or the non-viral class.

Methods

In this disclosure, several methods are introduced for solving the cascade prediction problem. Diffusion process in social network includes information of time series, network structure, sometimes with microblog content and node attributes, therefore, methods originated from knowledge in various research area like social network analysis, random point process and non-linear programming can be applied. The methods can be categorized into: centrality based methods, feature based methods and point process based methods.

Centrality Based Methods

Previous work discovered that the k-shell value of a node is highly correlated to the average cascade size it initiates. In this paper, we also consider eigenvector centrality, out-degree and Pagerank of the root node of cascades to deal with the cascade prediction problem. We refer to centrality based approaches as method C in this paper.

Feature Based Methods

In this disclosure, two methods are considered and will be referred to as method A and method B respectively for convenience. The features computed by the two methods can be categorized into network features, community based features and temporal features.

Both of the feature based methods require taking advantage of community detection algorithms. Given the social network, community detection algorithms can be applied to it and assign each node to one or multiple communities. Based on the communities detected, features can be computed to numerically describe how the nodes that participate in a cascade are distributed over communities. Thus, structural diversity can be quantitatively measured as features.

Network Features:

In method B, several types of network features are considered:

Neighborhood size, including first surface ($|F_1(V_t)|$) and second surface ($|F_2(V_t)|$).

Path length, consisting of average step distance and coefficient of variation of it, and diameter of the cascade. Step distance is the length of shortest path between two consecutive adopters $v_i$ and $v_{i+1}$.

Where coefficient of variation is defined as the ratio of the standard deviation to the mean.

Community Based Features:

Community features are extracted and contribute to the predictive methods.

Community features for adopters, including the number of communities ($|f_C(V(t))|$), entropy and gini entropy.

Community features for frontiers and non-adopters, including the number of communities ($|f_C(F_1(t))|$), entropy and gini entropy.

The number of shared communities between any two groups of adopters, frontiers and non-adopters.

Temporal Features:

The computed average of $t_v(t)$ (t) is computed while average step time and its corresponding coefficient of variation are calculated as two features.

Point Process Based Methods

To discover patterns in the temporal dynamics of cascades, a cascade is considered as an instance of one-dimensional point process in time space. They proposed novel density functions to characterize time series of cascades. The two methods are quite similar, in terms of the formulation of conditional density function $\lambda(t)$. In both cases, $\lambda(t)$ consists of an element modeling the popularity of the cascade and another describing the probability distribution of an adoption behavior over time.

The Reinforced Poisson Process (RPP) Method:

The density function for a cascade d is considered as a product of three elements:

$$\lambda_d(t) = \alpha_d f_d(t; \theta_d) |V(t)| \quad (3)$$

For cascade d, $\alpha_d$ denotes the intrinsic attractiveness, $f_d(t, \theta_d)$ is defined as the relaxation function which models how likely an adoption would happen at time t without considering $\alpha_d$ and $|V(t)|$. For each cascade d, parameters $\alpha_d$ and $\theta_d$ are learned by maximization of the likelihood of $t_v$ (t). Thus, the predicted cascade size at time $tN > t$ can be computed by:

$$|V(t')| = |V(t)| + \int_t^{t'} \alpha_d f_d(\tau; \theta_d) |V(\tau)| d\tau \quad (4)$$

The SEISMIC Method:

The density function was modeled as a modified Hawkes Process made up of three elements: infectiousness $p_t$, node degree $n_i$ and human reaction time distribution $\phi(s)$:

$$\lambda(t) = p_t \sum_{i=1}^{|V(t)|} n_i \phi(t - t_{vi}) \quad (5)$$

Where $t_{vi} \in t_v(t)$ is the time when each adoption happens. Similar to $\alpha_d$ in the Reinforced Poisson Process model, $p_t$ is computed by maximization of the likelihood function:

$$p_t = \underset{p_t}{\operatorname{argmax}} \prod_{i=0}^{|V(t)|-1} \lambda(t_{vi}) \exp - \int_{t_{vi}}^{\tau_{vi+1}} \lambda(\tau) d\tau \quad (6)$$

While the human reaction time distribution $\phi(s)$ is formulated as a piece-wise function consists of a constant piece and a power-law piece with parameter c and $\theta$:

$$\phi(s) = \begin{cases} c & s \le s_0 \\ c\left(\frac{s}{s_0}\right) - (1+\theta) & s > s_0 \end{cases} \quad (7)$$

TABLE V

Dataset Statistics

| Property | Twitter Dataset | Weibo Dataset |
|---|---|---|
| Directed | undirected | Directed |
| Nodes | 595,460 | 1,787,443 |
| Edges | 7,170,209 | 216,511,564 |
| Number of communities | 24,513 | 2,802 |
| Modularity | 0.7865 | 0.5581 |
| Average Out-degree | 47.94 | 231.3381 |
| Average Eigenvector Centrality | 0.001783 | 0.0186 |
| Average K-shell | 24.6032 | 52.3064 |
| Average Pagerank | $1.6794e^{-6}$ | $5.596e^{-7}$ |
| Cascades ($\ge 50$ nodes) | 14,607 | 99,257 |

As $\phi(s)$ is a probability distribution function, with the constraint $$\int_0^\infty \phi(s) ds = 1$$

and power-law decay factor $\theta$ estimated by training data, c can be computed. With the density function $\lambda(t)$, the predicted cascade size can be computed by equation (2).

Experimental Setup

For comprehensiveness, the performance of each method was evaluated by treating cascade prediction problem as both regression and classification problem. Cascades that end up with at least 50 adopters were considered. In this section, an introduction of the datasets is followed by descriptions of setup of the classification and regression experiments. All the experiments were carried out on an Intel(R) Xeon(R) CPU E5-2620@2.40 GHz machine with 256 GB RAM running Windows 7. All the methods are implemented in Python 2.7.

Dataset Description

The statistics of the two datasets used in this paper for evaluation of the cascade prediction methods are shown in Table V.

Twitter Dataset:

Twitter[1] is the most well-known microblog platform throughout the world. This dataset includes a friendship network with undirected edges, cascades identified by hashtags and corresponding mentions and retweets.

[1] https://twitter.com

Weibo Dataset:

Sina Weibo[2] is the largest Chinese microblog social network. The dataset consists of a directed followership network and retweet cascades.

[2] https://weibo.com

Regression

For the regression problem, the m×1 ground truth vector y is made up of final size of each cascade V ($t_{end}$), where m is the number of cascade. Each regression model is able to output a m×1 vector ŷ. Thus each element $\hat{y}_i \in \hat{y}$ is the predicted size of the ith cascade. For point process models, with different prediction time, the predicted results can change. Thus we set the prediction time as $\{2t_{end}, 4t_{end}, 6t_{end}, 8t_{end}, 10t_{end}\}$ for each cascade. To evaluate a method for the regression problem of cascade prediction, difference between its prediction results ŷ and the ground truth y can be described by various error functions. In addition, $\hat{y}_{top10\%}$ denotes the set of top 10% cascades in prediction result while $y_{top10\%}$ the set top of 10% cascades of ground truth. In this disclosure, the following metrics were chosen to compare the prediction made by different methods, as they are widely used in related literatures:

$$APE(\text{average percentage error}): \frac{1}{m}\sum_{i=1}^{m}\frac{|\hat{y}_i - y_i|}{y_i}$$

$$RMSE(\text{root mean square error}): \sqrt{\frac{\sum_{i=1}^{m}(\hat{y}_i - y_i)^2}{m}}$$

$$RMLSE(\text{root mean logrithm square error}): \sqrt{\frac{\sum_{i=1}^{m}(\log y_i - \log y_i)^2}{m}}$$

$$\text{Top 10\% coverage}: \frac{10}{m}|\hat{y}_{top\,10\%} \cap y_{top\,10\%}|$$

Classification

For classification, predetermined thresholds (50th, 75th and 90th percentiles) were applied to final size of cascades to assign each of them a class label, which provides the m×1 ground truth vector $L=\{l_0, \ldots, l_{m-1}\}$ one for each threshold. The cascades with size larger than threshold are labelled as viral class with $l_i=1$. Table II shows the thresholds and counts of samples for both classes. Then the methods for solving the classification problem can output predicted label vector L̂. Comparing L with L̂ results in standard metrics: precision, recall and F1 score. To examine the effectiveness of the methods, a focus was made on reporting the metrics on the minority class (viral) as it is more difficult to do good predictions for it than the other.

Specially, for point process based methods, as they are capable to predict the final cascade size without being trained with class labels (once parameters are determined and prediction times are selected), the evaluation on them was carried out in this way: prediction results (by setting different prediction times) were treated as features for each sample. As the time when each cascade stop growing is not easy to determine.

Run Time

The run time of tasks were taken into account for the cascade prediction methods. To understand how computationally expensive the methods are in terms of run time, it is necessary to analyze the procedure of them. For centrality based methods, the prediction can be divided into three steps: computation of centrality, training and prediction. Similarly, for feature based methods, computation of features, training and prediction are required to be done. In addition, preprocessing like community detection, computation of shortest path length is needed, which can be computationally expensive. While point process based methods require little preprocessing. For each cascade, parameters are computed independently through MLE of the observed time vector $t_v$ (t) and properties of the adopters V (t). Then prediction is made by integral of density functions. Thus, the following processes are considered one by one and then combined together to estimate the run time of a certain method functions. Thus, the following processes are considered one by one and then combined together to estimate the run time of a certain method.

TABLE VI

Thresholds for Classification

| Percentile | Threshold | Viral samples | Non-viral samples |
|---|---|---|---|
| Twitter Dataset | | | |
| 50% | 106 | 7,303 | 7,304 |
| 75% | 226 | 3,652 | 10,955 |
| 90% | 587 | 1,461 | 13,146 |
| Weibo Dataset | | | |
| 50% | 152 | 49,628 | 49,629 |
| 75% | 325 | 24,814 | 74,443 |
| 90% | 688 | 9,925 | 89,332 |

Proprecessing:

There are three types of proprecessing considered: loading the graph, computation of centralities and community detection.

Computation of Features:

For feature based methods, the run time of computation of the features was measured, which takes the product of preprocessing as input.

Training and Prediction:

For centrality and feature based methods, the run time of training and prediction is measured for ten-folds. For point process based methods, we measure the run time of parameter estimation and prediction for the whole batch of data.

Experimental Results

In this section, the experimental results are shown including both accuracy of cascade prediction and the run time for each method. For convenience, the centrality based method is referred to as method A, B and C respectively. For method A, B and C, 10-fold cross-validation is applied. For results where we compare these three methods, we report only the best-performing centrality measure amongst out-degree, Pagerank, Shell number and eigenvector centrality as the method C for each dataset. As shown in FIGS. 17A-17F, eigenvector centrality outperforms others in the classification task when the two classes are imbalanced. Thus, method C effectuates the eigenvector centrality. The results for regression are not shown here for limited space as the difference between results produced by different centralities is trivial. For the Reinforced Poisson Process (RPP) method, as the parameter estimation task for each cascade is independent of others, the cross-validation is skipped and predictions are made by parameters learned from first 50 nodes of each cascade. For the SEISMIC method, the 10-fold cross-validation is skipped. The cutoff time $s_0=30000(s)$ is set for the Twitter dataset and $s_0=300(s)$ for the Weibo dataset then fit the parameters ($\theta$, c) for the human reaction time distribution function $\phi(s)$ with all samples in the dataset. $\theta$ and c was set just by 15 tweets they manually picked. The power-law fitting is done, which returns ($\theta$, c)=(0.440, $1.018e^{-5}$) and (0.282, $7.332e^{-4}$) for the Twitter dataset and Weibo dataset respectively.

Regression

For centrality based methods, linear regression is applied with least squared error. The training and prediction is carried out with random forest regressor, SVR and linear regression model provided for feature based methods. The results are only shown produced by SVR as it outperforms others. For the point process based methods, t we only report the best result among prediction time out of $\{2t_{end}, 4t_{end}, 6t_{end}, 8t_{end}, 10t_{end}\}$ where $t_{end}$ is the time we observed the 50th adoption of the cascade, defined in Section II.

For the Twitter dataset, FIGS. 18A-18D show the experimental results for the regression problem. Feature based methods and SEISMIC outperform RPP and method C w.r.t. APE. Concerning RMSE, method A shows more predictive power than other methods. As to RMSLE, feature based methods result in less error than the other two categories. From the aspect of Top 10% coverage, RPP, method A are more likely to track the trending cascades than others.

FIGS. 18E-18H show the regression result for the Weibo dataset, Regarding APE, SEISMIC, method A and B have comparable performance and outperform others. In terms of RMSE, methods A, B are measured to be more predictive than the rest. Feature based methods also make predictions with least RMSLE. For top 10% coverage, RPP is more likely to detect popular cascades than others.

Figure 18B:
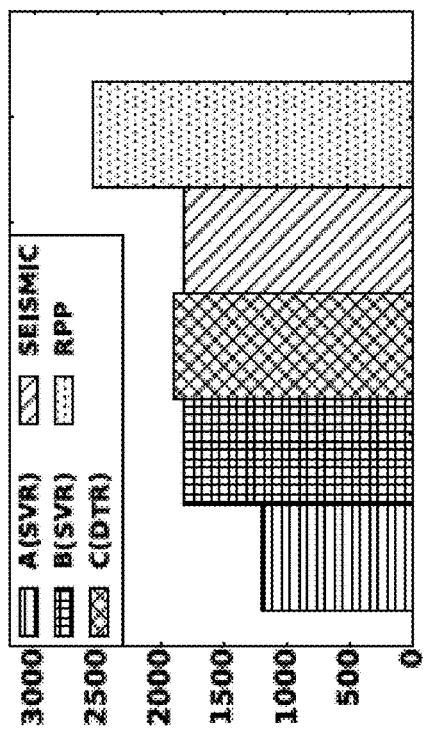
FIGS. 18A-18H are graphs showing test results for the regression problem.
Figure 18A:
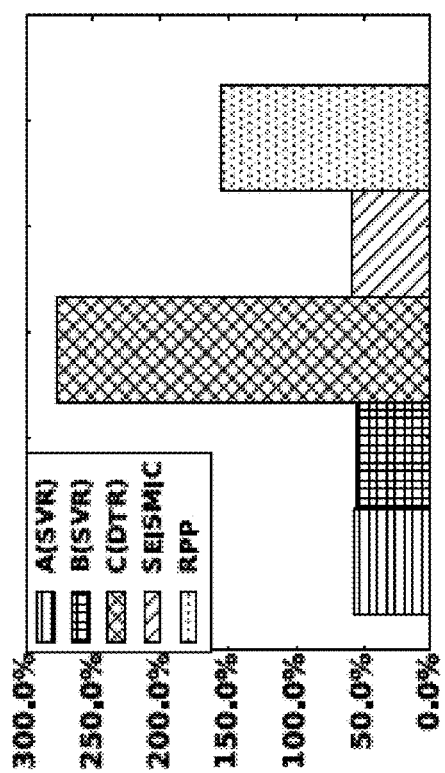
Figure 18D:
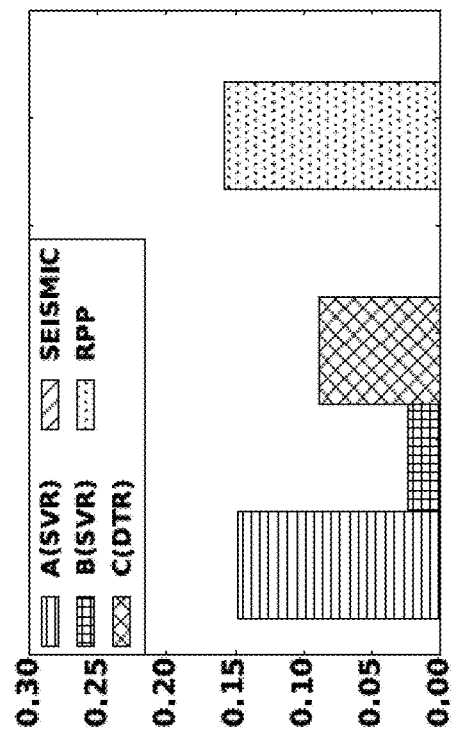
Figure 18C:
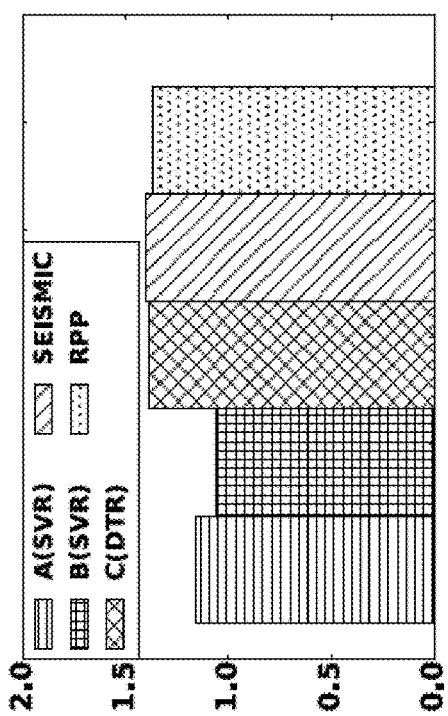
Figure 18F:
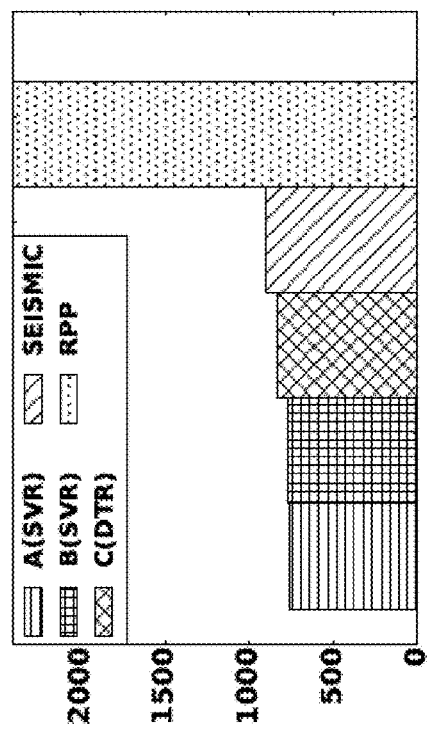
Figure 18E:
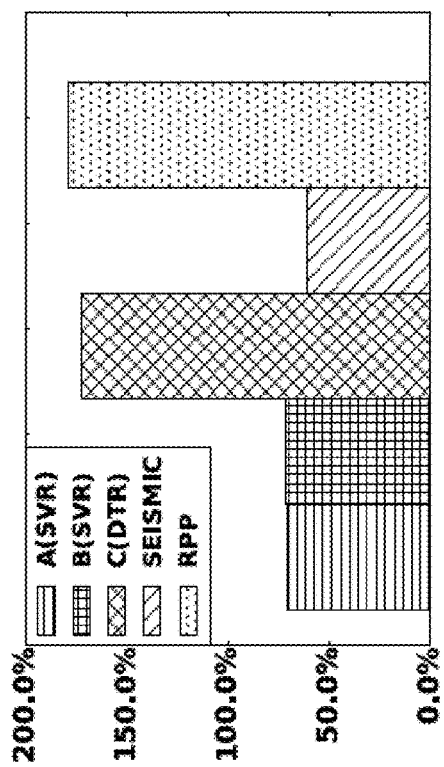
Figure 18H:
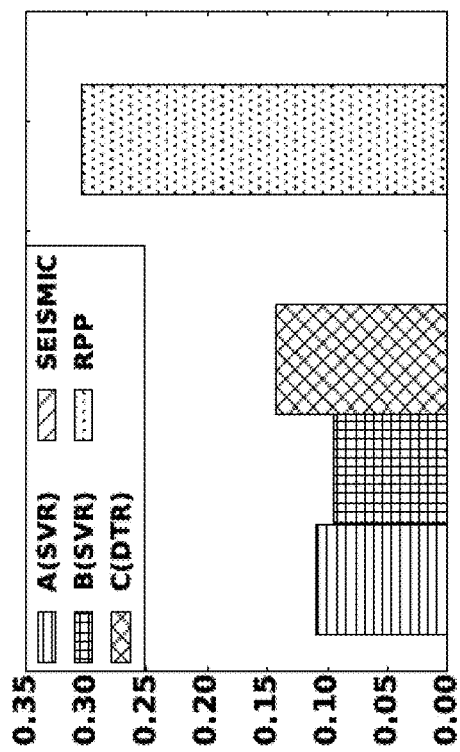
Figure 18G:
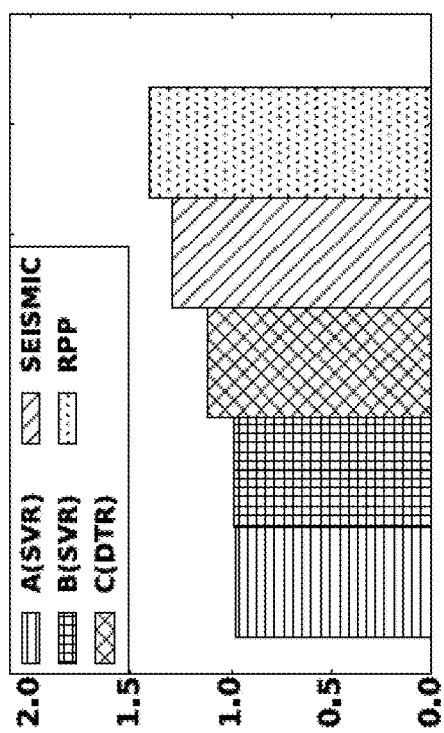

An interesting observation is that the prediction accuracy measured by different error metrics can be contrary to each other. For example, in FIG. 18A, compared to SEISMIC, prediction made by method C results in more error measured by APE, however, comparable error w.r.t. RMSE and less error regarding RMSLE (See FIGS. 18B and 18C). This implies that it is better for researchers to show more than one type of error for evaluation of regression results.

Classification

Precision, recall and FI score is shown for the viral class with all the three percentile thresholds. For each dataset, the 50th, 75th and 90th percentiles of the final size of all cascades are chosen as the thresholds for assigning the cascades into viral or non-viral class. The number of samples in each class is shown in Table VI. Thus, the cascade prediction methods are evaluated with balanced and imbalanced classes. For each method, only the best result is shown among those produced by different classifiers or various training methods. As a result, for feature based methods, random forest outperforms others. While for point process based methods cascade size predicted by setting prediction time is treated as $\{2t_{end}, 4t_{end}, 6t_{end}, 8t_{end}, 10t_{end}\}$ as features. Here we show the results produced by classifiers trained by these features.

Figure 19B:
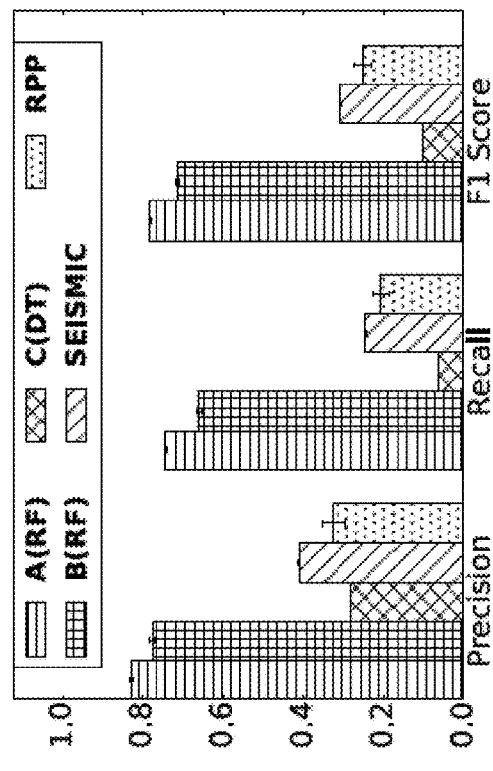
FIGS. 19A-19F are graphs showing classification results in which the error bar stand for one standard deviation.
Figure 19A:
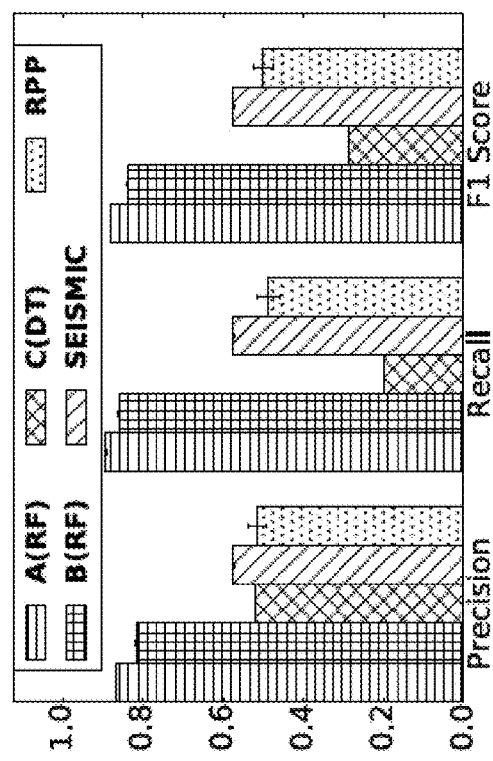
Figure 19D:
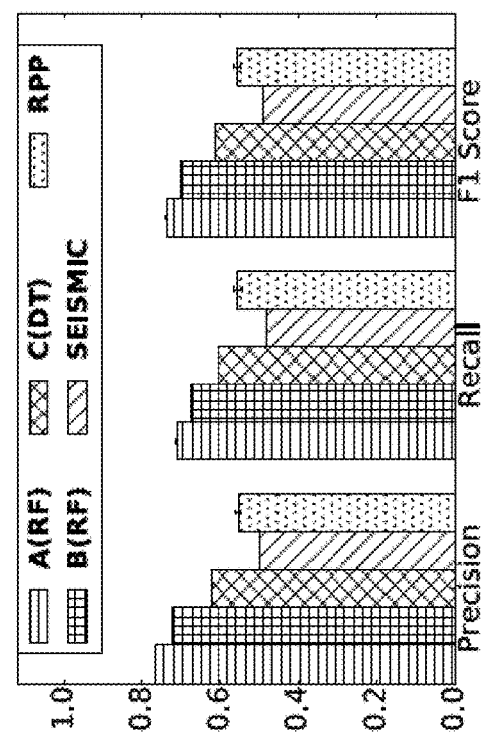
Figure 19C:
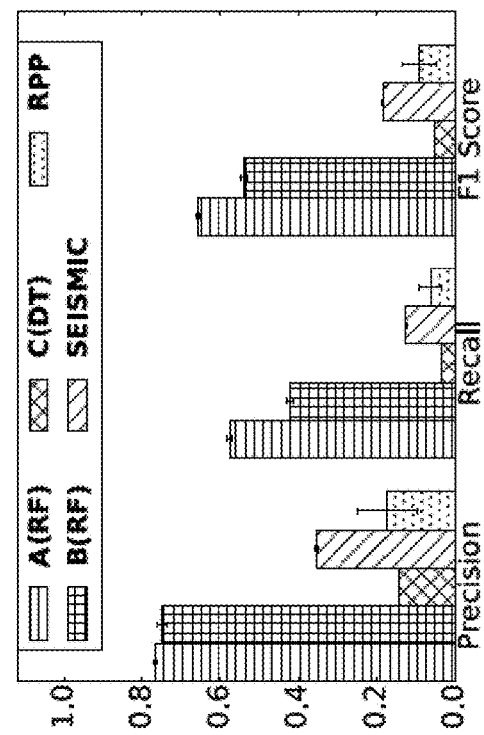

FIGS. 19A-19C show the classification results for the Twitter dataset. With all three thresholds, feature based methods A and B outperform others. In addition, they also show more robustness than others to imbalance of two classes in dataset. In terms of point process based methods, SEISMIC outperforms RPP especially when the two classes are imbalanced. RPP suffers from relatively large standard deviation, as the Newton's method is not always able to achieve convergence. Thus the parameters learned through the MLE approach can vary as a result from random initialization. Method C (eigenvector centrality) shows little predictive power with any of the three thresholds for the Twitter dataset, even if it outperforms other centrality based methods.

Figure 19F:
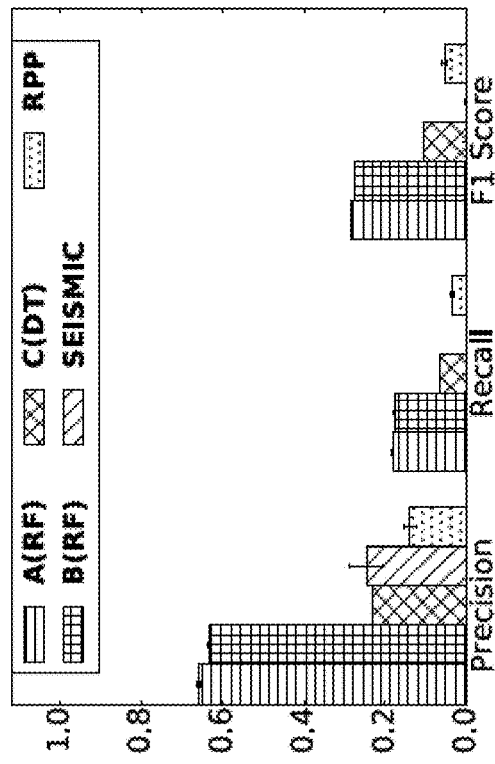
Figure 19E:
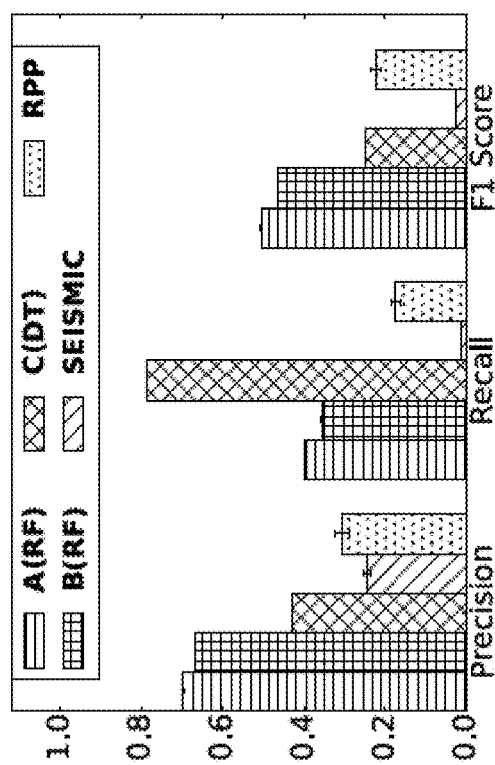

For the Weibo dataset, as shown in FIGS. 19D-19F, feature based methods outperform others again with all three thresholds. Regarding point process based methods, contrary to the results for Twitter dataset, RPP achieves better FI score than SEISMIC when threshold value becomes large. Method C (eigenvector centrality) performs comparably to RPP.

Run Time

In this subsection, the run time of tasks is shown for the cascade prediction methods considered in this disclosure. On one hand, preprocessing, computation of centralities and features suffer from high overhead as immense amount of data needs to be loaded. The run time of these tasks are listed in Table III. On the other hand, training and prediction tasks barely have the overhead issue.

Preprocessing:

The community detection task is carried out by the java implementation of Louvain algorithm with 10 random start and 10 iterations for each start. For computation of centralities, we load edgelist of the social networks as a graph object in igraph-python. As shown in Table BI, community detection, computation of Pagerank and loading graph are the tasks suffer the most when the size of dataset increases. Community detection, computation of Pagerank and loading graph for the Weibo dataset take 80.32, 66.855 and 19.80 times the run time of those for the Twitter dataset respectively.

Computation of Features:

As shown in Table VII, for the feature computation task, it takes method B 12.37 and 8 times the run time method of A for the Twitter Dataset and the Weibo Dataset respectively. To explain this observation, an analysis of what computation is carried out in each iteration for method A and B. For method A, computation of the features can be done without loading the graph (a heavy overhead). Moreover, for each cascade, method B also requires expensive computation of shortest path length for each pair of nodes in cascade subgraphs and size of 2-hop neighborhood.

Training and Prediction:

The run time of training and prediction is not directly related to the size of the social network. On one hand, it is correlated to the number of cascades for training and prediction. On the other hand, it is decided by the complexity of the method: for example, number of parameters to be learned, the complexity for learning each parameter and the consumption to work out the prediction. Here we only measure the run time for solving the classification problem. Each method is run with a single process, overhead run time such as graph loading is ignored. For feature based methods the training and prediction time are also correlated to the number of features. For centrality based methods, only the run time is shown for k-shell (method C) as all methods in this category are trained and tested with one feature: the centrality measure of the root node. Compared to RPP, SEISMIC is a deterministic method with closed form solution. The run time for each sample can be distributed with little variance. For the RPP method, as the log-likelihood function is non-convex, it is not guaranteed that global maximum can be reached in limited number of iterations. Therefore, the run time for a sample running out of the maximum number of iterations can be thousands times that of another, which reaches the convergence condition in the first iteration. As the log-likelihood function of RPP is twice-differentiable, Newton's method can be applied. In our experiments, with the maximum number of iterations setted as 100, the convergence is more likely to be achieved by Newton's method than gradient descent. Thus, only the run time of RPP with Newton's method is shown.

Figure 20B:
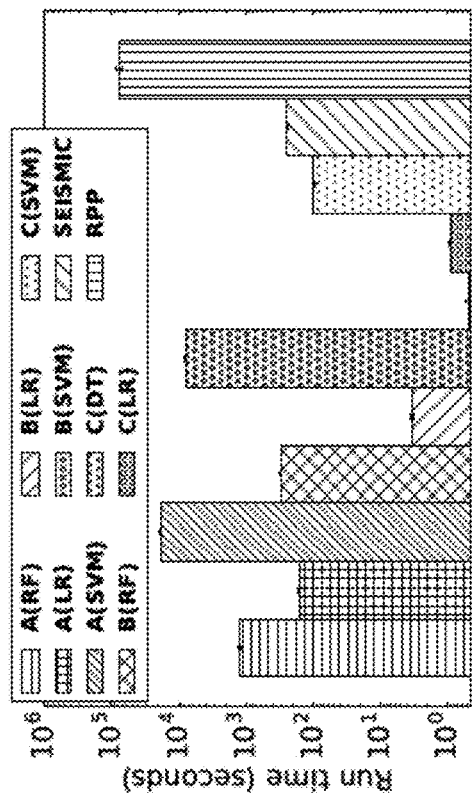
FIGS. 20A-20B are graphs showing run time of training and prediction.
Figure 20A:
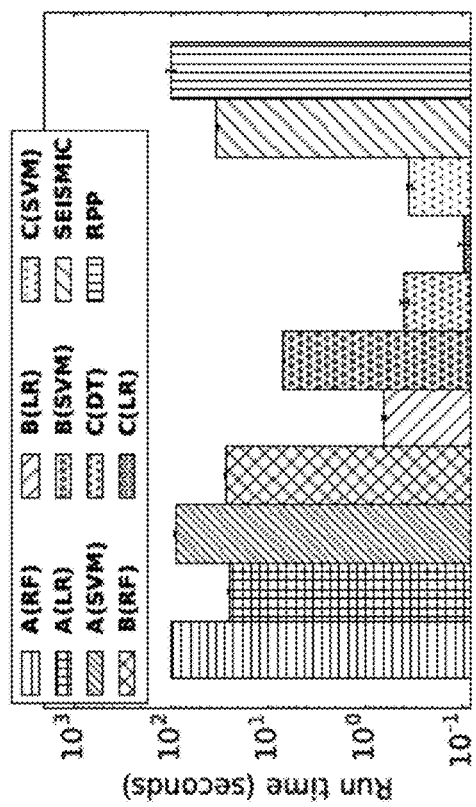

FIGS. 20A and 20B show the run time for each method to complete training and prediction tasks for all cascades in the two datasets. For feature based methods, it shows the run time needed for random forest (RF), SVM and logistic regression (LR). For method C, it shows that of decision tree (DT), SVM and logistic regression (LR).

Concerning the Twitter dataset (See FIG. 20A), taking advantage of decent implementation of classifiers, feature based methods comparable run time to point process based methods w.r.t. the training and prediction task with random forest and SVM (rbf kernel).

TABLE VII

Run time: Preprocessing & Feature Computation

| Type | Task | Total time(s) | Time per sample(s) |
|---|---|---|---|
| Twitter Dataset | | | |
| Preprocessing | Louvain | 275 | — |
| | Loading | 60.033 | — |
| | Graph | 0.016 | — |
| | Degree | 2.757 | — |
| | K-shell | 20.444 | — |
| | Eigenvector Pagerank | 26.298 | — |
| Feature Computation | A | 267.144 | 0.018 |
| | B | 3252.7562 | 0.2227 |
| Weibo Dataset | | | |
| Preprocessing | Louvain | 22087 | — |
| | Loading | 1188.486 | — |
| | Graph | 0.045 | — |
| | Degree | 139.128 | — |
| | K-shell | 391.140 | — |
| | Eigenvector Pagerank | 1758.164 | — |
| Feature Computation | A | 11181.453 | 0.110 |
| | B | 87651.213 | 0.883 |

For the Weibo dataset, as shown in FIG. 20B, the run time feature based methods consume is comparable to SEISMIC with random forest. But the SVM with rbf kernel suffers from the order-of-magnitude increase of the number of training and testing samples. Thus leads to the observation that the run time becomes approximately 10 times that of random forest.

Comparing FIG. 20B with FIG. 20A, the run time of RPP method increases the most. This means it is much more difficult for the Newton's method to converge for samples in the Weibo datasets. There are two possible reasons to explain this: 1). the uniform distribution used in random initialization cannot produce good initial values that are closed to local optimal points; 2). the choice of log-norm distribution as function fd (t; $\theta_d$) cannot provide fairly good description of cascades in this dataset.

Case Study

LookingGlass is an innovative technological platform that tracks social movements at transnational, national, and subnational levels. It provides real-time contextual analysis in complex sociopolitical situations that are rife with uncertainty. By providing "looking glasses" that enable decision makers and analysts to see through the "big text" into cultures, attitudes, events and relationships that impact their missions, it overcomes language barriers and cultural biases while identifying, tagging, and analyzing vast amounts of text and images in real-time to achieve greater situational awareness, draw better conclusions, and make better decisions.

One of the most innovative aspects of LookingGlass technology is the development of new computational representations, algorithms, and tools with the following capabilities:

displays sizes and geographic footprints of all social-media active groups;

displays (transnational) links and interactions (conflicts and alliances) between groups;

identifies locations and demographic information of influential online followers;

shows formation and drivers (events and narratives) of groups, group growth, shrinkage, mergers and splits; and provides real-time information about patterns related to hot spots, groups and individuals.

LookingGlass bootstraps these capabilities by providing easy-to-use graphical tools that judiciously tap into area experts. Looking Glass utilizes mixed quantitative and qualitative analysis to combine thick-description area studies with "big text" quantitative text analytics to create rich interpretable pictures of complex and dynamic environments and real-time contextual modeling.

LookingGlass Libya

LookingGlass is well positioned to develop concrete applications to support LTI 2's ability to 1) analyze the evolving political and security situation in Libya to support more effective programming and 2) monitor and evaluate the impact of LTI 2 activities. As outlined below, we propose to develop a LookingGlass for Libya to provide LTI decisions makers and analysts with information and insight to meet LTI 2's strategic objectives: increasing the credibility of and confidence in national governance, and countering the ability of violent extremist groups to recruit, spread their message, and gain support.

Immediate goals (Phase I): The immediate goals for this proposal include development of an initial LookingGlass platform for Libya and a set of analytics for tracking the impact of Chemonics messaging in social media. The particular functionalities are described in more details below.

Longer term goals (Phase II, III, and IV): Over the long term, we envision enhancing the LookingGlass platform with additional analytics and capabilities, including research analytics for tracking group dynamics, developing scales for tracking latent variables and their impact on conflict, and creating a "wizard" that will automate the process for inputting new groups into the platform.

Timeline and Tasks for Phase I

| Timeline and Tasks for Phase I: | | | | | |
|---|---|---|---|---|---|
| | Phase I | | | | |
| | 5/23-6/5 | 6/6-6/19 | 6/20-7/3 | 7/4-7/17 | 7/18-7/31 |
| Task IA. LookingGlass Libya | | | | | |
| Groups and Ideologies | X | X | | | |
| Sentiment Analysis | X | X | | | |
| Libyan News & Events | | X | X | | |
| User Testing & Feedback | | | X | X | X |
| Task IB. Diffusion Analytics | | | | | |
| Diffusion Analysis | X | X | X | | |
| Diffusion Graphs | | X | X | X | |
| Influential Users | | | X | X | X |
| Breaking News & Tags | | | | X | X |
| Visual Media Analysis | | | | X | X |

Milestone/Functionality

LG Libya on-line interface that has the following functionality:

Shows relative size of supporters and geographic footprints of all social-media active groups.

Finds influential/central online supporters of groups and their geographic locations.

Shows daily and trending sentiments for and against GNA and known extremist groups.

Shows popular visual media (i.e. images, video) for all groups.

Provides real-time alerts about hot spots, breaking news and hashtags.

Shows Libyan news and events on a timeline.

Capabilities

In regards to Strategic Objective 1: Increasing the credibility of and confidence in national governance, LookingGlass will support LTI 2 analytics by providing:

A capacity to better understand the dynamics of the online discourse around national governance and the GNA and the online networks in which this discourse takes place.

Understanding how this discourse responds to events and messaging.

In regards to Strategic Objective 2: Countering the ability of violent extremist groups to recruit, spread their message, and gain support, LookingGlass will support LTI 2 analytics by providing:

A capacity to better understand the extremist landscape and discourse on Libyan social media, particularly the spectrum including mainstream Maliki religious authorities, conservative Islamist groups like the Muslim Brotherhood, apolitical Salafism, political and activist Salafism, and Salafi Jihadi groups.

Identifying key actors, networks and themes to better refine and target messaging.

Phase IB: Diffusion Analytics-Chemonics Messaging (May-June, 2016)

Deliverable: Diffusion analytics will be delivered no later than 70 days from the start of the project, based on inputs from Chemonics related to LTI2 social media activities submitted no later than 30 days after the start of the project.

Inputs

From Chemonics: A description LTI 2 social media activities no later than 30 days into the project.

From ASU: PI Davulcu will work out with Chemonics team the exact mechanism for providing inputs. This may involve several skype conversations and email correspondence.

From ASU and Chemonics: Development of a feedback mechanism for assessing and refining the analytics.

Milestone/Functionality

LG Libya interface that has the following functionality:

Ability to input LTI 2 social media activity descriptors and track their diffusion in social media.

Capabilities

In regards to Strategic Objective 1: Increasing the credibility of and confidence in national governance, LookingGlass will support LTI 2 analytics by providing:

The ability to better understand the impact, if any, that LTI 2 social media activities are having on the discourse around the GNA and national government.

In regards to Strategic Objective 2: Countering the ability of violent extremist groups to recruit, spread their message, and gain support, LookingGlass will support LTI 2 analytics by providing:

The ability to better understand the impact, if any, that LTI 2 social media activities are having on the discourse around extremism in western Libya.

Figure 21:
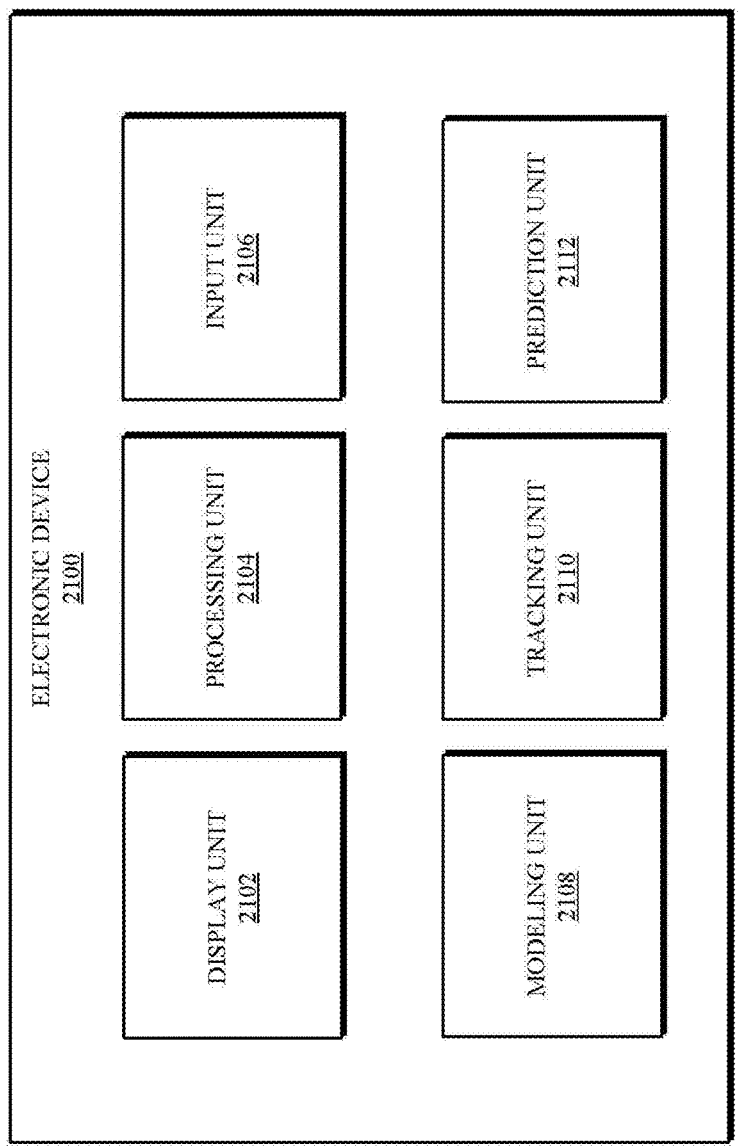
FIG. 21 is a simplified block diagram of an electronic device.

Turning to FIG. 21, an example electronic device 2100 including operational units 2102-2112 arranged to perform various operations of the presently disclosed technology is shown. The operational units 2102-2112 of the device 2100 are implemented by hardware or a combination of hardware and software to carry out the principles of the present disclosure. It will be understood by persons of skill in the art that the operational units 2102-2112 described in FIG. 21 may be combined or separated into sub-blocks to implement the principles of the present disclosure. Therefore, the description herein supports any possible combination or separation or further definition of the operational units 2102-2112.

In one implementation, the electronic device 2100 includes a display unit 2102 configured to display information, such as a graphical user interface, and a processing unit 2104 in communication with the display unit and an input unit 2106 configured to receive data from one or more input devices or systems. Various operations described herein may be implemented by the processing unit 2104 using data received by the input unit 2106 to output information for display using the display unit 2102. In one particular implementation, a predicted order-of-magnitude viral cascade of a message posted on a social network system is displayed on the display unit 2102 for a user of the electronic device 2100 to view.

Additionally, in one implementation, the electronic device 2100 includes units implementing the operations described herein. For example, the electronic device 2100 may include a modeling unit 2108 for generating a model of a social network system, including nodes representing users of the system and edges representing connections between the users of the system. A tracking unit 2110 may also be included in the electronic device 2100 to track reposts of a message across the social network system. Further still, the electronic device 2100 may include a prediction unit 2112 to predict an order-of-magnitude viral cascade of a message posted on a social network system across the social network model. Additional units may also be included but are not shown.

Figure 22:
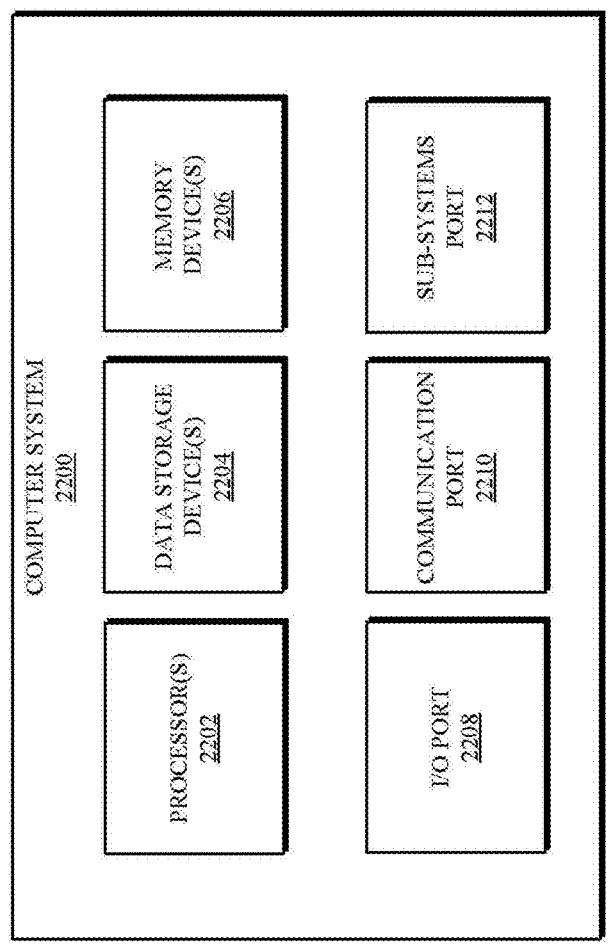
FIG. 22 is a simplified block diagram of a computer system.

Referring to FIG. 22, a detailed description of an example computing system 2200 having one or more computing units that may implement various systems and methods discussed herein is provided. The computing system 2200 may be applicable to the system described herein. It will be appreciated that specific implementations of these devices may be of differing possible specific computing architectures not all of which are specifically discussed herein but will be understood by those of ordinary skill in the art.

The computer system 2200 may be a computing system is capable of executing a computer program product to execute a computer process. Data and program files may be input to the computer system 2200, which reads the files and executes the programs therein. Some of the elements of the computer system 2200 are shown in FIG. 22, including one or more hardware processors 2202, one or more data storage devices 2204, one or more memory devices 2206, and/or one or more ports 2208-2212. Additionally, other elements that will be recognized by those skilled in the art may be included in the computing system 2200 but are not explicitly depicted in FIG. 22 or discussed further herein. Various elements of the computer system 2200 may communicate with one another by way of one or more communication buses, point-to-point communication paths, or other communication means not explicitly depicted in FIG. 22.

The processor 2202 may include, for example, a central processing unit (CPU), a microprocessor, a microcontroller, a digital signal processor (DSP), and/or one or more internal levels of cache. There may be one or more processors 2202, such that the processor comprises a single central-processing unit, or a plurality of processing units capable of executing instructions and performing operations in parallel with each other, commonly referred to as a parallel processing environment.

The computer system 2200 may be a conventional computer, a distributed computer, or any other type of computer, such as one or more external computers made available via a cloud computing architecture. The presently described technology is optionally implemented in software stored on the data stored device(s) 2204, stored on the memory device(s) 2206, and/or communicated via one or more of the ports 2208-2212, thereby transforming the computer system 2200 in FIG. 22 to a special purpose machine for implementing the operations described herein. Examples of the computer system 2200 include personal computers, terminals, workstations, mobile phones, tablets, laptops, personal computers, multimedia consoles, gaming consoles, set top boxes, and the like.

The one or more data storage devices 2204 may include any non-volatile data storage device capable of storing data generated or employed within the computing system 2200, such as computer executable instructions for performing a computer process, which may include instructions of both application programs and an operating system (OS) that manages the various components of the computing system 2200. The data storage devices 2204 may include, without limitation, magnetic disk drives, optical disk drives, solid state drives (SSDs), flash drives, and the like. The data storage devices 2204 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 2206 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 2204 and/or the memory devices 2206, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 2200 includes one or more ports, such as an input/output (I/O) port 2208, a communication port 2210, and a sub-systems port 2212, for communicating with other computing, network, or vehicle devices. It will be appreciated that the ports 2208-2212 may be combined or separate and that more or fewer ports may be included in the computer system 2200.

The I/O port 2208 may be connected to an I/O device, or other device, by which information is input to or output from the computing system 2200. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 2200 via the I/O port 2208. Similarly, the output devices may convert electrical signals received from computing system 2200 via the I/O port 2208 into signals that may be sensed as output by a human, such as sound, light, and/or touch. The input device may be an alphanumeric input device, including alphanumeric and other keys for communicating information and/or command selections to the processor 2202 via the I/O port 2208. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

In one implementation, a communication port 2210 is connected to a network by way of which the computer system 2200 may receive network data useful in executing the methods and systems set out herein as well as transmitting information and network configuration changes determined thereby. Stated differently, the communication port 2210 connects the computer system 2200 to one or more communication interface devices configured to transmit and/or receive information between the computing system 2200 and other devices by way of one or more wired or wireless communication networks or connections. For example, the computer system 2200 may be instructed to access information stored in a public network, such as the Internet. The computer 2200 may then utilize the communication port to access one or more publicly available servers that store information in the public network. In one particular embodiment, the computer system 2200 uses an Internet browser program to access a publicly available website. The website is hosted on one or more storage servers accessible through the public network. Once accessed, data stored on the one or more storage servers may be obtained or retrieved and stored in the memory device(s) 2206 of the computer system 2200 for use by the various modules and units of the system, as described herein.

Examples of types of networks or connections of the computer system 2200 include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 2210 to communicate one or more other machines, either directly over a point-to-point communication path, over a wide area network (WAN) (e.g., the Internet), over a local area network (LAN), over a cellular (e.g., third generation (3G) or fourth generation (4G)) network, or over another communication means. Further, the communication port 2210 may communicate with an antenna for electromagnetic signal transmission and/or reception.

The computer system 2200 may include a sub-systems port 2212 for communicating with one or more additional systems to perform the operations described herein. For example, the computer system 2200 may communicate through the sub-systems port 2212 with a large processing system to perform one or more of the calculations discussed above.

The system set forth in FIG. 22 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

Figure 23:
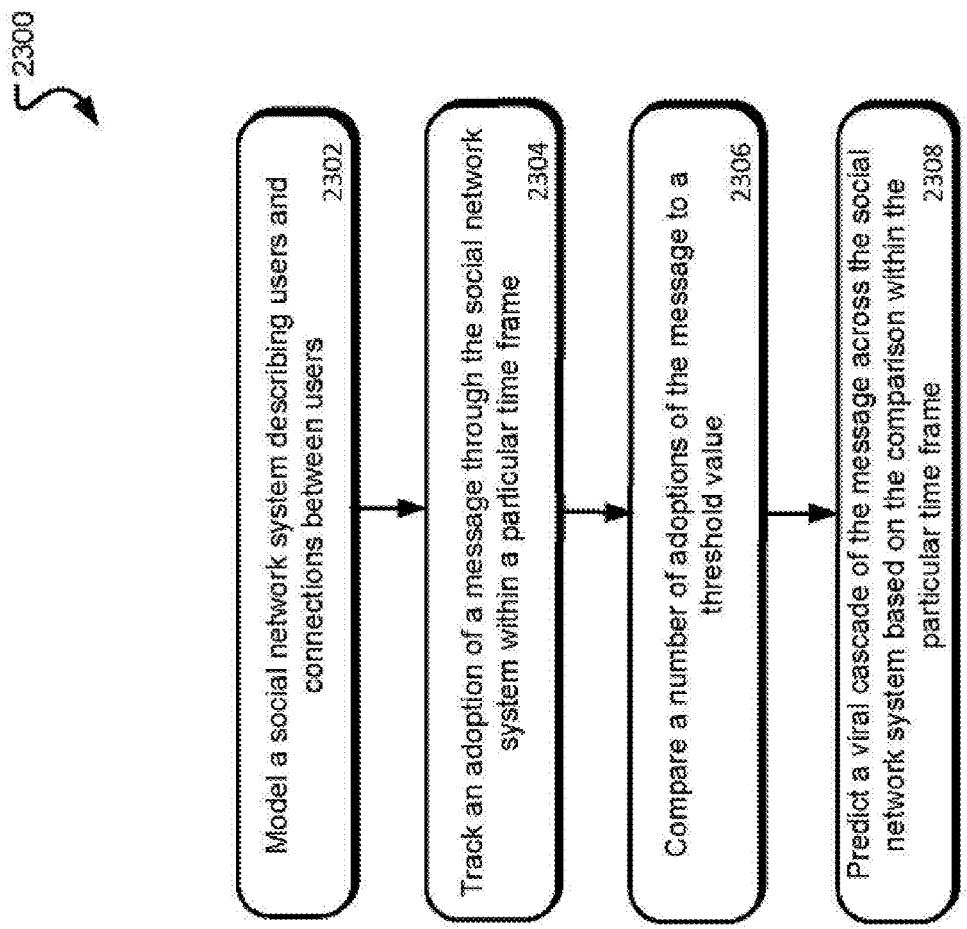
FIG. 23 is a flowchart of an exemplary method of present disclosure.

FIG. 23 is a flowchart of an exemplary method of present disclosure. The operations of the illustrated method 2300 may be performed by a computing system, such as that described in relation to FIG. 22. In operation 2302, the computing system generates a social network model with nodes representing the users of a social network system and edges representing connections between the users of the social network system. In operation 2304, the computing system tracks an adoption of a message through the social network model by the users of the social network system. In one embodiment, this tracking may occur for a particular time frame. A comparison of the number of adoptions within the social network system is made to a threshold value in operation 2306. In operation 2308, a prediction of an order-of-magnitude viral cascade of the message is made based on the tracking of the adoption through the social network system. In one embodiment, a prediction of a viral cascade is made if the adoption of the messages exceeds the threshold value within the particular time frame.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A method for processing information associated with social networks, the method comprising:
utilizing a processor, configured for:
generating a social network model comprising a plurality of nodes representing a plurality of users and user devices associated with a social network system and a plurality of edges representing connections between the plurality of users of the social network system;
tracking an adoption through the social network model by the plurality of users of the social network system of a message posted to the social network system for a particular time frame;
applying a community detection algorithm to information associated with the social network model to assign each node of the plurality of nodes to one or multiple communities; and
implementing a system for cascade prediction, including:
providing a plurality of structural diversity measurements, and
computing a classification to predict an order-of-magnitude viral cascade of the message in the social network system based on the tracking of the adoption through the social network model by the plurality of users of the social network system of a message posted to the social network system by:
leveraging the plurality of structural diversity measurements as features, including based on the one or more communities assigned, computing at least some of the features to numerically describe how the plurality of nodes that participate in the cascade are distributed over communities, the features including a measurement of a Gini Impurity and a measure of overlap represented as a number of shared communities associated with the plurality of nodes.

2. The method of claim 1 wherein the adoption of the posted message comprises a reposting of the message to the social network system by a subset of the plurality of users of the social network system.

3. The method of claim 2 further comprising:
comparing the reposting of the message by the subset of the plurality of users of the social network system to a threshold value of reposts of the message.

4. The method of claim 3 wherein the threshold value is 500 reposts of the message.

5. The method of claim 3 wherein the message is predicted as an order-of-magnitude viral message if the tracked reposting of the message by the subset of the plurality of users of the social network system exceeds the threshold value within the particular time frame.

6. The method of claim 5 wherein the particular time frame for tracking the adoption by the subset of the plurality of users of the social network system of the message posted to the social network system through the social network model is 60 minutes.

7. The method of claim 1 wherein the social network system comprises at least one server storing a plurality of webpages accessible by the plurality of users of the social network system.

8. A system for processing information associated with social networks, the method comprising:
a processing device for processing data in a social network system; and
a computer-readable medium associated with the processor and including instructions stored thereon and executable by the processor to:
generate a social network model comprising a plurality of nodes representing a plurality of users of the social network system and a plurality of edges representing connections between the plurality of users of the social network system;
track an adoption through the social network model by the plurality of users of the social network system of a message posted to the social network system for a particular time frame; and
implement a system for cascade prediction that leverages a plurality of structural diversity measurements as features for classification to predict
an order-of-magnitude viral cascade of the message in the social network system based on the tracking of the adoption through the social network model by the plurality of users of the social network system of a message posted to the social network system
wherein the plurality of structural diversity measurements include a number of communities associated with the plurality of nodes, a measure of overlap represented as a number of shared communities associated with the plurality of nodes, a probability of a node being placed in an incorrect community using a measurement of a Gini Impurity, an average time to the adoption by adopters associated with the plurality of nodes, and a number of the plurality nodes.

9. The system of claim 8 wherein the social network system comprises at least one server storing a plurality of webpages accessible by the plurality of users of the social network system.

10. The system of claim 8 wherein the adoption of the posted message comprises a reposting of the message to the social network system by a subset of the plurality of users of the social network system.

11. The system of claim 10 wherein the instructions stored on the computer-readable medium further cause the processor to:
compare the reposting of the message by the subset of the plurality of users of the social network system to a threshold value.

12. The system of claim 11 wherein the threshold value is 500.

13. The system of claim 11 wherein the message is predicted as an order-of-magnitude viral message if the tracked reposting of the message by the subset of the plurality of users of the social network system exceeds the threshold value within the particular time frame.

14. The system of claim 13 wherein the particular time frame for tracking the adoption by the subset of the plurality of users of the social network system of the message posted to the social network system through the social network model is 60 minutes.

15. The method of claim 1, wherein the plurality of structural diversity measurements include a number of communities associated with the plurality of nodes, a number of shared communities associated with the plurality of nodes, a probability of a node being placed in an incorrect community, an average time to the adoption by adopters associated with the plurality of nodes, and a number of the plurality nodes.

16. The method of claim 1, wherein the cascade prediction is based solely upon information about a topology associated with the social network model as interpreted by the plurality of structural diversity measurements computed by the system as implemented without consideration of message content.

17. The method of claim 1, wherein the features define time-based features and size based features.

18. The method of claim 1, further comprising assigning weights to a subset of the features associated with grouped ones of the plurality of structural diversity measurements.

* * * * *